(12) United States Patent
Milne et al.

(10) Patent No.: US 8,417,618 B2
(45) Date of Patent: Apr. 9, 2013

(54) UTILIZING A TRIGGER ORDER WITH MULTIPLE COUNTERPARTIES IN IMPLIED MARKET TRADING

(75) Inventors: Andrew Milne, Maplewood, NJ (US); Aleksandr Sedlin, Brooklyn, NY (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 750 days.

(21) Appl. No.: 12/553,351

(22) Filed: Sep. 3, 2009

(65) Prior Publication Data

US 2011/0055067 A1    Mar. 3, 2011

(51) Int. Cl.
*G06Q 40/00*    (2006.01)
(52) U.S. Cl. .......................................... 705/37
(58) Field of Classification Search ....................... 705/37
See application file for complete search history.

(56) References Cited

U.S. PATENT DOCUMENTS

| | | | |
|---|---|---|---|
| 4,677,552 A | 6/1987 | Sibley, Jr. | |
| 4,903,201 A | 2/1990 | Wagner | |
| 4,980,826 A | 12/1990 | Wagner | |
| 5,500,812 A | 3/1996 | Saishi et al. | |
| 5,787,402 A | 7/1998 | Potter et al. | |
| 6,021,397 A | 2/2000 | Jones et al. | |
| 6,047,274 A | 4/2000 | Johnson et al. | |
| 6,317,727 B1 | 11/2001 | May | |
| 6,321,212 B1 | 11/2001 | Lange | |
| 6,347,307 B1 | 2/2002 | Sandhu et al. | |
| 6,356,911 B1 | 3/2002 | Shibuya | 707/101 |
| 6,405,180 B2 | 6/2002 | Tifors et al. | |
| 6,418,419 B1 | 7/2002 | Nieboer et al. | |
| 6,421,653 B1 | 7/2002 | May | |
| 6,618,707 B1 | 9/2003 | Gary | |
| 6,658,393 B1 | 12/2003 | Basch et al. | |
| 6,721,715 B2 | 4/2004 | Nemzow | |
| 6,829,589 B1 | 12/2004 | Saliba | |
| 6,996,540 B1 | 2/2006 | May | |
| 7,039,610 B2 | 5/2006 | Morano et al. | 705/37 |
| 7,043,457 B1 | 5/2006 | Hansen | |
| 7,089,206 B2 | 8/2006 | Martin | |
| 7,130,789 B2 | 10/2006 | Glodjo et al. | |
| 7,177,833 B1 | 2/2007 | Marynowski et al. | |
| 7,194,481 B1 | 3/2007 | Van Roon | |
| 7,231,363 B1 | 6/2007 | Hughes et al. | |

(Continued)

FOREIGN PATENT DOCUMENTS

| | | |
|---|---|---|
| EP | 0407026 A2 | 1/1991 |
| EP | 0411748 A2 | 2/1991 |

(Continued)

OTHER PUBLICATIONS

International Search Report dated Oct. 13, 2010 received in related PCT Application No. PCT/US2010/046591.

(Continued)

*Primary Examiner* — Harish T Dass
*Assistant Examiner* — Siegfried E Chencinski
(74) *Attorney, Agent, or Firm* — Lempia Summerfield Katz LLC

(57) ABSTRACT

An electronic trading system utilizes a Match Engine that receives orders, stores them internally, calculates tradable combinations and advertises the availability of real and implied orders in the form of market data. Calculating tradable combinations or cycles for certain strategies becomes complex. Strategies that utilize legs having different volume ratios may form tradable combinations that will traverse a trigger order more than one time.

22 Claims, 14 Drawing Sheets

U.S. PATENT DOCUMENTS

| | | | |
|---|---|---|---|
| 7,246,092 B1 | 7/2007 | Peterson et al. | |
| 7,280,481 B2 | 10/2007 | Rong | 370/238 |
| 7,299,208 B1 | 11/2007 | Bailon et al. | |
| 7,542,937 B1 | 6/2009 | Cohen | |
| 7,542,940 B2 | 6/2009 | Burns et al. | |
| 7,542,941 B1 | 6/2009 | Cohen | |
| 7,548,882 B1 | 6/2009 | Pazner | |
| 7,685,052 B2 | 3/2010 | Waelbroeck et al. | |
| 7,908,199 B2* | 3/2011 | Neff et al. | 705/37 |
| 7,933,827 B2 | 4/2011 | Richmann et al. | |
| 8,024,253 B2* | 9/2011 | Peterffy et al. | 705/37 |
| 2001/0042785 A1 | 11/2001 | Walker et al. | |
| 2001/0056398 A1 | 12/2001 | Scheirer | |
| 2002/0002530 A1 | 1/2002 | May | |
| 2002/0035531 A1 | 3/2002 | Push | |
| 2002/0070915 A1 | 6/2002 | Mazza | |
| 2002/0077947 A1 | 6/2002 | Ward et al. | |
| 2002/0099651 A1 | 7/2002 | May | |
| 2002/0116314 A1 | 8/2002 | Spencer et al. | |
| 2002/0116317 A1 | 8/2002 | May | |
| 2002/0156719 A1 | 10/2002 | Finebaum et al. | |
| 2002/0169774 A1 | 11/2002 | Greenbaum et al. | |
| 2002/0178102 A1 | 11/2002 | Scheinberg et al. | |
| 2002/0194115 A1 | 12/2002 | Nordlicht et al. | |
| 2003/0004899 A1 | 1/2003 | Bergenudd | |
| 2003/0009419 A1 | 1/2003 | Chavez et al. | |
| 2003/0023542 A1 | 1/2003 | Kemp | |
| 2003/0033240 A1 | 2/2003 | Balson et al. | |
| 2003/0050879 A1 | 3/2003 | Rosen et al. | |
| 2003/0093360 A1 | 5/2003 | May | |
| 2003/0125982 A1 | 7/2003 | Ginsberg et al. | |
| 2003/0200167 A1 | 10/2003 | Kemp, II et al. | |
| 2003/0220868 A1 | 11/2003 | May | |
| 2003/0229571 A1 | 12/2003 | May | |
| 2003/0236737 A1 | 12/2003 | Kemp, II et al. | |
| 2003/0236738 A1 | 12/2003 | Lange et al. | |
| 2004/0015430 A1 | 1/2004 | May | |
| 2004/0015431 A1 | 1/2004 | May | |
| 2004/0039682 A1 | 2/2004 | Sandholm et al. | |
| 2004/0049738 A1 | 3/2004 | Thompson et al. | |
| 2004/0064395 A1 | 4/2004 | Mintz et al. | |
| 2004/0088242 A1 | 5/2004 | Ascher et al. | |
| 2004/0093300 A1 | 5/2004 | Burns | |
| 2004/0103054 A1 | 5/2004 | Singer | |
| 2004/0117302 A1 | 6/2004 | Weichert et al. | |
| 2004/0148242 A1 | 7/2004 | Liu | |
| 2004/0153391 A1 | 8/2004 | Burns | |
| 2004/0153392 A1 | 8/2004 | West et al. | |
| 2004/0153393 A1 | 8/2004 | West et al. | |
| 2004/0153394 A1 | 8/2004 | West et al. | |
| 2004/0172337 A1 | 9/2004 | Spoonhower et al. | |
| 2004/0186806 A1 | 9/2004 | Sinclair et al. | |
| 2004/0210514 A1 | 10/2004 | Kemp, II et al. | |
| 2004/0236662 A1 | 11/2004 | Korhammer et al. | |
| 2004/0254804 A1 | 12/2004 | Peterfry et al. | |
| 2005/0044027 A1 | 2/2005 | Rodgers et al. | |
| 2005/0080703 A1 | 4/2005 | Chiesa et al. | |
| 2005/0086152 A1 | 4/2005 | Sweeting | |
| 2005/0097026 A1 | 5/2005 | Morano et al. | 705/37 |
| 2005/0097027 A1 | 5/2005 | Kavanaugh | |
| 2005/0137964 A1 | 6/2005 | Nordlicht et al. | |
| 2005/0171890 A1 | 8/2005 | Daley et al. | |
| 2005/0171894 A1 | 8/2005 | Traynor | |
| 2005/0187866 A1 | 8/2005 | Lee | |
| 2005/0246263 A1 | 11/2005 | Ogg et al. | |
| 2005/0283422 A1 | 12/2005 | Myr | |
| 2006/0015436 A1 | 1/2006 | Burns et al. | |
| 2006/0059064 A1 | 3/2006 | Glinberg et al. | |
| 2006/0059065 A1 | 3/2006 | Glinberg | |
| 2006/0059066 A1 | 3/2006 | Glinberg | |
| 2006/0059067 A1 | 3/2006 | Glinberg | |
| 2006/0059068 A1 | 3/2006 | Glinberg | |
| 2006/0059069 A1 | 3/2006 | Glinberg | |
| 2006/0095363 A1 | 5/2006 | May | |
| 2006/0143099 A1 | 6/2006 | Partlow et al. | |
| 2006/0149660 A1 | 7/2006 | Morano et al. | |
| 2006/0161498 A1 | 7/2006 | Morano et al. | |
| 2006/0173761 A1 | 8/2006 | Costakis | |
| 2006/0190371 A1 | 8/2006 | Almgren et al. | |
| 2006/0190383 A1 | 8/2006 | May | |
| 2006/0259406 A1 | 11/2006 | Kemp et al. | |
| 2006/0259409 A1 | 11/2006 | Burns et al. | |
| 2006/0265296 A1 | 11/2006 | Glinberg | |
| 2006/0293998 A1 | 12/2006 | Tilly et al. | |
| 2007/0011079 A1 | 1/2007 | May | |
| 2007/0100732 A1 | 5/2007 | Ibbotson et al. | |
| 2007/0112665 A1 | 5/2007 | Mackey, Jr. et al. | |
| 2007/0239591 A1 | 10/2007 | May | |
| 2007/0282733 A1 | 12/2007 | May | |
| 2008/0010187 A1 | 1/2008 | Farrell et al. | |
| 2008/0077320 A1 | 3/2008 | Loftus et al. | |
| 2008/0077521 A1 | 3/2008 | Sibley et al. | |
| 2008/0086405 A1 | 4/2008 | Sundaram et al. | 705/37 |
| 2008/0133402 A1 | 6/2008 | Kurian et al. | |
| 2008/0154764 A1 | 6/2008 | Levine et al. | |
| 2008/0183639 A1 | 7/2008 | Disalvo | |
| 2008/0208778 A1 | 8/2008 | Sayyar-Rodsari et al. | |
| 2008/0288386 A1 | 11/2008 | Ferris | |
| 2008/0288391 A1 | 11/2008 | Downs et al. | |
| 2009/0006244 A1* | 1/2009 | Kemp et al. | 705/37 |
| 2009/0018944 A1 | 1/2009 | DeVerdier | |
| 2009/0063365 A1 | 3/2009 | Pinkas | |
| 2009/0076982 A1 | 3/2009 | Ginberg et al. | |
| 2009/0083175 A1 | 3/2009 | Cushing | |
| 2009/0106133 A1 | 4/2009 | Redmayne | |
| 2009/0157563 A1 | 6/2009 | Serbin et al. | |
| 2009/0228400 A1 | 9/2009 | Burns et al. | |
| 2009/0327153 A1 | 12/2009 | Milne | |
| 2010/0017321 A1 | 1/2010 | Callaway et al. | |
| 2010/0017323 A1 | 1/2010 | Zimmerman | |
| 2010/0094746 A1 | 4/2010 | MacGregor et al. | |
| 2010/0174633 A1 | 7/2010 | Milne et al. | |
| 2010/0312689 A1 | 12/2010 | Bauerschmidt et al. | |
| 2011/0040669 A1 | 2/2011 | Lee et al. | |
| 2011/0055067 A1 | 3/2011 | Milne et al. | |
| 2011/0055069 A1 | 3/2011 | Pazner | |
| 2011/0066536 A1 | 3/2011 | Milne | |
| 2011/0066537 A1 | 3/2011 | Milne et al. | |
| 2011/0066567 A1 | 3/2011 | Acuna-Rohter et al. | |
| 2011/0066568 A1 | 3/2011 | Milne et al. | |
| 2011/0087579 A1 | 4/2011 | Milne et al. | |
| 2011/0313905 A1 | 12/2011 | Siddall et al. | |
| 2011/0320334 A1 | 12/2011 | Mintz et al. | |

FOREIGN PATENT DOCUMENTS

| | | |
|---|---|---|
| JP | 2000/353196 A | 12/2000 |
| JP | 2001/222591 A | 8/2001 |
| WO | WO 03077061 A2 | 9/2003 |

OTHER PUBLICATIONS

International Search Report dated Oct. 25, 2010 received in related PCT Application No. PCT/US2010/047489.

Augmenting agent negotiation protocols with a dynamic argumentation mechanism, by Ulrich, Thomas W., D.CS., Colorado Technical University, 2003, 253 pages; AAT 3109037.

International Search Report dated Dec. 10, 2010 received in related PCT Application No. PCT/US2010/52589.

U.S. Appl. No. 10/700,406, filed Nov. 4, 2003.

U.S. Appl. No. 11/368,966, filed Mar. 6, 2006.

U.S. Appl. No. 09/971,172, filed Oct. 4, 2001.

U.S. Appl. No. 12/032,379, filed Feb. 15, 2008.

U.S. Appl. No. 12/350,788, filed Jan. 8, 2009.

International Search Report received in related PCT application No. PCT/US2010/047086 dated Oct. 13, 2010.

International Search Report received in related PCT application No. PCT/US2010/047075 dated Oct. 14, 2010.

U.S. Appl. No. 12/560,026, filed Sep. 15, 2009, Morano, et al.

U.S. Appl. No. 12/560,122, filed Sep. 15, 2009, Milne, et al.

U.S. Appl. No. 12/560,145, filed Sep. 15, 2009, Milne, et al.

U.S. Appl. No. 12/579,118, filed Sep. 15, 2009, Milne, et al.

PCT/US06/44932 International Search Report Aug. 19, 2008.

PCT/US06/43282 International Search Report May 30, 2008.

PCT/US06/44702 International Search Report Aug. 17, 2007.

PCT/US06/44917 International Search Report Aug. 28, 2007.

PCT/US06/28001 International Search Report May 7, 2007.

PCT/US06/27762 International Search Report Mar. 9, 2007.

CME® "Clearing Services CME and LCH"; Advisory Notice; http://www.web.archive.org/web/20050306002321/ http:/www.cme.com/clearing/rmspan/cm/Ich . . . , last accessed Feb. 22, 2007; 1 page.

CME® "Clearing Services Layout for Results"; Advisory Notice; http://www.web.archive.org/web/20050308181020/ http://www.cme.com/clearing/rmspan/cm/rec . . . , last accessed Feb. 22, 2007, 2 pages.

CME® "Foreign Exchange Products; Trading CME FX Futures: Maximizing the Opportunity for the Individual Investor"; 2005; 6 pages.

CME® "Glossary for Retail FX"; http://www.cme.com/files/FXWebglossary.pdf; 16 pages.

Position Limit, http://www.investopedia.com/terms/p/positionlimit/asp; 4 pages.

U.S. Commodity Futures Trading Commission; "Security Futures Products Speculative Position Limits"; http://www.cftc.govlindustryoversight/contractsandproducts/sfpspeculativelimits.html; Jul. 26, 2007; 1 page.

U.S. Commodity Futures Trading Commission; "What's New at the CFTC"; http://www.cftc.gov/index.html; Mar. 19, 2009; 2 pages.

U.S. Commodity Futures Trading Commission; "Trading Organizations"; http://www.cfttc.gov/industryoversign/tradingorganizations.index.html; Mar. 19, 2009; 1 page.

U.S. Commodity Futures Trading Commission; "Clearing Organizations"; http://www.cftc.gov/industryoversight/clearingorganizations/index.html; Mar. 19, 2009; 2 pages.

Hall "Getting Started in Stocks"; Third Edition; Google Book Search; http://books.google.com/books?id=mA-sSK mB2sC &dg=margin+account+maintenance . . . ; Sep. 26, 2008; pp. 105-114; Coughlan Publishing; 1997.

K. Balasubramanian et al, "Developing Applications Using Model-Driven Design Environments", IEEE Computer, Feb. 2006 (vol. 39, No. 2).

K. Chen et al, "Towards Formalizing Domain-specific Modeling Languages", Vanderbilt University Institute for Software Integrated Systems, presented at the Object Management Group (OMG) OMG's First Annual Model-Integrated Computing Workshop, 2004.

G. Guizzardi et al, "On the role of Domain Ontologies in the design of Domain-Specific Visual Modeling Languages", Proceedings of the 17$^{th}$ ACM Conference on Object-Oriented Programming, Systems, Languages and Applications (OOPSLA 2002), Seattle, USA, 2002, Helsinki School of Economics Printing, Working Paper Series @-334 (ISSN 1235-5674), downloaded from Centre for Telematics and Information Technology, University of Twente, The Netherlands.

G. Guizzardi et al, "Ontology-Based Evaluation and Design of Domain-Specific Visual Modeling Languages", Proceedings of the 14$^{th}$ International Conference on Information Systems Development, Karlstad, Sweden, 2005.

G. Karsai et al, "Model-Integrated Development of Embedded Software", Proceedings of the IEEE, Jan. 2003, vol. 91, No. 1.

D. Schmidt, "Model-Driven Engineering", IEEE Computer Feb. 2006; vol. 39, No. 2.

Peake, The National Book System, an Electronically Assisted Auction Market, pp. 02290-02353 (Apr. 30, 1976).

Intex, The International Futures Exchange (Bermuda) Limited, Functional Specifications, pp. 01932-01999 (Aug. 1981).

Blank, John J.: "Implied Trading in Energy Futures," The Journal of Trading, vol. 2, No. 3, pp. 45-48, Summer 2007.

Bolshev, L.N.: "Least Squares, Method of," SpringerLink, Encyclopaedia of Mathematics, 2001, pp. 1-7.

Office Action in related U.S. Appl. No. 12/579,118, dated Nov. 14, 2011, 13 pages.

Office Action in related U.S. Appl. No. 12/560,026, dated Nov. 14, 2011, 14 pages.

International Preliminary Report on Patentability dated Mar. 6, 2012 received in related PCT Application No. PCT/US2010/047086.

CME Group, Product Specific Functionality, Version 1.5, Mar. 14, 2012.

International Preliminary Report on Patentability dated Mar. 20, 2012 received in related PCT Application No. PCT/US20101047489.

\* cited by examiner

| Contract Symbol | Description | Buy Order Node Pair | Sell Order Node Pair |
|---|---|---|---|
| HOF | Heating Oil, January Delivery, Outright | 1,0 | 0,1 |
| HOG | Heating Oil, February Delivery, Outright | 2,0 | 0,2 |
| HOH | Heating Oil, March Delivery, Outright | 3,0 | 0,3 |
| CLF | Crude Oil, January Delivery, Outright | 4,0 | 0,4 |
| CLG | Crude Oil, February Delivery, Outright | 5,0 | 0,5 |
| CLH | Crude Oil, March Delivery, Outright | 6,0 | 0,6 |
| HOF:HOG | Buy Jan Heat, Sell Feb Heat, Calendar Spread | 1,2 | 2,1 |
| HOF:HOH | Buy Jan Heat, Sell Mar Heat, Calendar Spread | 1,3 | 3,1 |
| HOG:HOH | Buy Feb Heat, Sell Mar Heat, Calendar Spread | 2,3 | 3,2 |
| CLF:CLG | Buy Jan Crude, Sell Feb Crude, Calendar Spread | 4,5 | 5,4 |
| CLF:CLH | Buy Jan Crude, Sell Mar Crude, Calendar Spread | 4,6 | 6,4 |
| CLG:CLH | Buy Feb Crude, Sell Mar Crude, Calendar Spread | 5,6 | 6,5 |
| HOF:CLF | Buy Jan Heat, Sell Jan Crude, Intercommodity Spread | 1,4 | 4,1 |
| HOG:CLG | Buy Feb Heat, Sell Feb Crude, Intercommodity Spread | 2,5 | 5,2 |
| HOH:CLH | Buy Mar Heat, Sell Mar Crude, Intercommodity Spread | 3,6 | 6,3 |

FIG. 4

UTILIZING A TRIGGER ORDER WITH MULTIPLE COUNTERPARTIES IN IMPLIED MARKET TRADING

RELATED APPLICATIONS

This application is related to U.S. patent application Ser. No. 10/700,406, filed Nov. 4, 2003, which is incorporated herein by reference in its entirety.

This application is related to U.S. patent application Ser. No. 11/368,966, filed Mar. 6, 2006, which is a division of U.S. patent application Ser. No. 09/971,172, filed on Oct. 4, 2001, all of which are incorporated herein by reference in its entirety.

This application is related to U.S. patent application Ser. No. 12/032,379, filed Feb. 15, 2008, which is incorporated herein by reference in its entirety.

This application is related to U.S. patent application Ser. No. 12/350,788, filed Jan. 8, 2009, which is incorporated herein by reference in its entirety.

TECHNICAL FIELD

The following disclosure relates to software, systems and methods for electronic trading in a commodities exchange, derivatives exchange or similar business involving tradable items where orders from buyers are matched with orders from sellers.

BACKGROUND

Electronic trading systems allow entry of a bid or offer for a particular tradable item, which in futures trading is referred to as a contract. The simplest possible futures contract is the outright contract defined by a product and a delivery period. It is also possible to define combination contracts, such as the spread contract defined as the simultaneous purchase and sale of two tradable items, such as futures contracts for different months, different commodities, or different grades of the same commodity. The bid and offer components of a spread are termed the bid leg and the offer leg respectively.

Electronic trading systems accept bids and offers in the form of orders, also referred to as real orders because they consist of data entered by traders either directly or by computing devices under their control. Real orders may be entered for any tradable item in the system including, but not limited to, futures, options, inter-commodity spreads, intra-commodity spreads, futures strips, calendar spreads, butterfly spreads, condor spreads, crack spreads, straddles, and strangles.

Implied orders, unlike real orders, are generated by the system on the behalf of traders who have entered real orders, generally with the purpose of increasing overall market liquidity. For example, an implied spread may be derived from two real outrights. Trading systems create the "derived" or "implied" order and display the market that results from the creation of the implied order as a market that may be traded against. If a trader trades against this implied market, then the real orders that utilized to derive the implied order(s) and the resulting implied market are executed as matched trades.

Generating an implied market is a complex process because of, among other things, the large number of potential order combinations, upon which implied orders may be based. For example, a single commodity product available in 72 different delivery months will have 72 possible outright contracts, each of which may have a resting buy order or a resting sell order. There are 2556 (=(72* 71)/2) potential spread contracts, noting that the buy/sell combination and sell/buy combination of any two outrights both correspond to the same spread contract. For a simple implied where two orders combine to form a third, there are 5256 (=2*72+2*2556) choices of the order to imply and 71 (=72−1) ways to choose a combination of two orders implying any given third order, leading to 373,156 combinations overall. As the number of contracts involved in the implication gets larger, the number of possible combinations grows exponentially. The problem is further aggravated when the implied orders can include orders in combination contracts with multiple legs.

For these reasons, trading systems that derive implied orders are often limited by computing capacity and speed. Conventional trading systems do not have an efficient method of determining all possible or best possible implied markets, especially when the order combinations involve more than a few orders.

Implied orders frequently have better prices than the corresponding real orders in the same contract. This can occur when two or more traders incrementally improve their order prices in hope of attracting a trade. Combining the small improvements from two or more real orders can result in a big improvement in the implied order. In general, advertising implied orders at better prices will encourage traders to enter the opposing orders to trade with them. The more combinations that the Match Engine can calculate, the greater this encouragement will be, and the more the exchange will benefit from increased transaction volume. However, as the number of advertised orders increases, so does the time required to calculate and publish them as market data. This creates a problem for the exchange, since traders expect a quick response from the trading system and are ready to take their business elsewhere if they do not get it.

The inability to calculate and publish implied orders in a timely manner has limited their use. In these systems only a few simple combinations are calculated and then only for a small number of heavily traded contracts.

BRIEF DESCRIPTION OF THE DRAWINGS

FIG. 4 is a table that explains the orders that could be represented on the simple contract grid of FIG. 3a.

DETAILED DESCRIPTION

The order matching function in a trading system is typically performed by a specialized component referred to as a Match Engine, of which there may be multiple instances. Each Match Engine is a specialized order matching component that receives orders, stores them internally, calculates tradable combinations and advertises the availability of real and implied orders in the form of market data. Traders, in turn, utilize the trading system to respond to the market data by sending additional orders. These additional orders are received by the Match Engine, which then attempts to match them with previously received orders or combinations thereof. The Match Engine executes the possible trades and communicates the results.

Identifying tradable implied orders is especially challenging when the real orders upon which they are based are part of a complicated trading strategy. A combination contract or "strategy" is defined by two or more outright contracts which are referred to as legs. Strategies that utilize legs having different volume ratios may form tradable combinations that require the trigger order to be used at more than one position in the combination. Examples of strategies that include legs having different volume ratios include, but are not limited to, the butterfly, the double butterfly, crack spreads, crush spreads, and other ratio spreads, which are discussed in detail below.

The embodiments are illustrated and described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved are readily extended to other protocols and interfaces in a predictable fashion.

Regulated and unregulated exchanges and other electronic trading services make use of electronic trading systems. For example, the following embodiments are applicable to any trading or futures market in the United States or elsewhere in the world, for example, the Chicago Board of Trade (CBOT), the Chicago Mercantile Exchange (CME), the Bolsa de Mercadorias e Futoros in Brazil (BMF), the London International Financial Futures Exchange, the New York Mercantile Exchange (NYMEX), the Kansas City Board of Trade (KCBT), MATIF (in Paris, France), the London Metal Exchange (LME), the Tokyo International Financial Futures Exchange, the Tokyo Commodity Exchange for Industry (TOCOM), the Meff Renta Variable (in Spain), the Dubai Mercantile Exchange (DME), and the Intercontinental Exchange (ICE).

Figure 1:
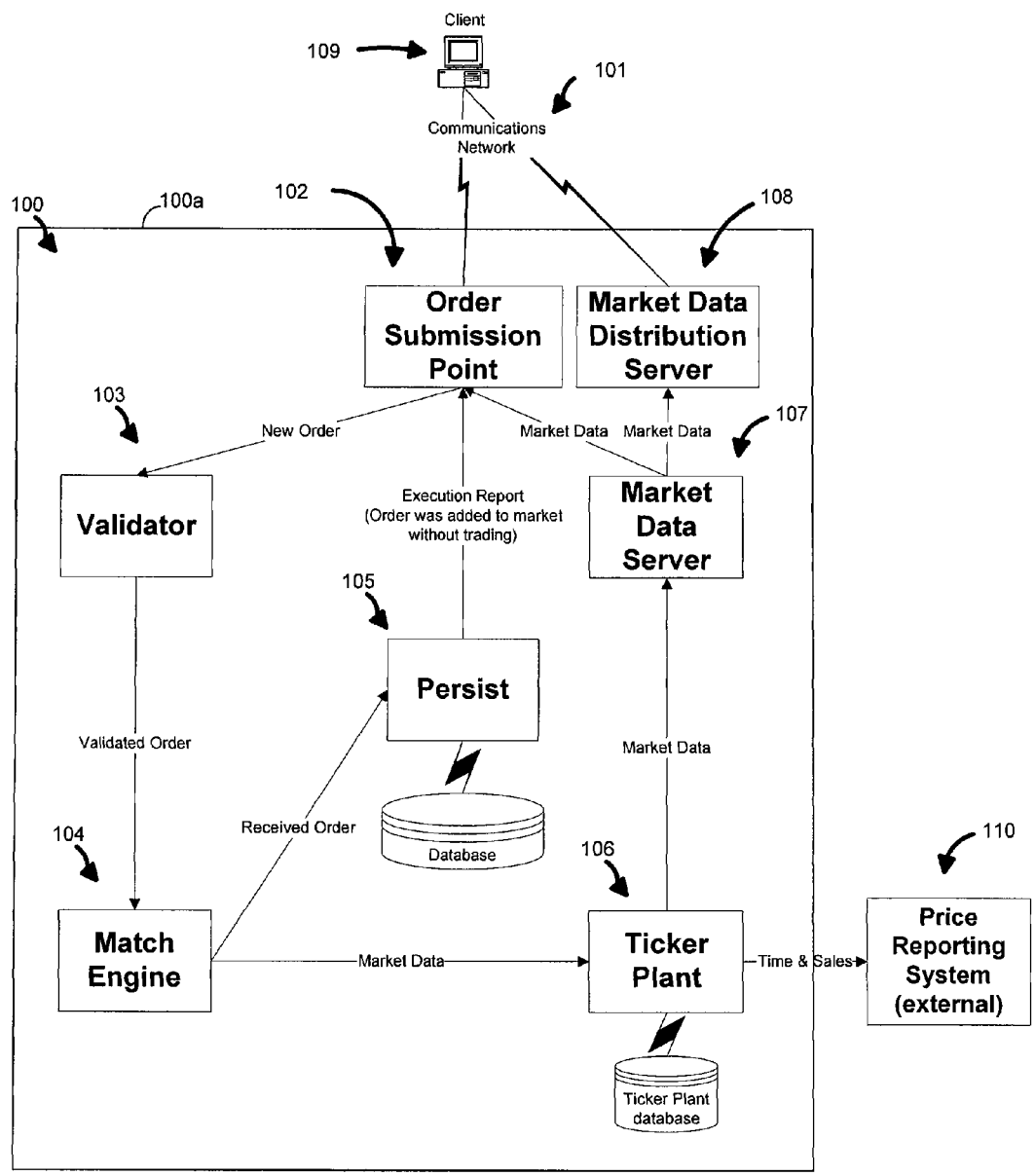
FIG. 1 illustrates an exemplary electronic trading system.

An example of the functional layout of such an electronic trading system 100 is shown in FIG. 1. In this example, the electronic trading system 100 includes the components shown within the system boundary 100a. The client 109 and the price reporting system 110 are shown outside the system boundary 100a but communicate with the electronic trading system 100 using a communications network 101 such as the Internet. The term client is used generically to indicate any user operated device or other networked device capable of communicating with the electronic trading system 100.

In an exemplary implementation, the client 109 transmits electronic orders to an Order Submission Point 102 by way of the communication network 101, such as the Internet. It is contemplated that Order Submission Points 102 may take on a wide variety of application-specific designs to suit the needs of particular brokerages, investors, investment plans and the like. It is also contemplated that the electronic trading system 100 may contain multiple Validators 103, Match Engines 104, Persist components 105, Ticker Plants 106, Market Data Servers 107 and Market Data Distribution Servers 108. The routing of messages between these components 103 to 108 may be managed with commercially available hardware and software. It should be understood that descriptions are given in the singular only to simplify the exposition.

The Order Submission Point 102 communicates with the Validator 103. The Validator 103 checks the properties of the new order against established criteria and communicates the validated order to the relevant Match Engine 104. In FIG. 1, it is assumed that the new order did not match any previously entered orders, so the Match Engine 104 communicates a received order to the Persist component 105, which stores the order in its database. In FIG. 1, it is also assumed that the storage of the order by the Persist component 105 constitutes its "official" reception by the trading system, so the Persist component 105 communicates an execution report to the Order Submission Point 102, from which it is communicated to the originator of the order. The Persist component 105 may be implemented as part (such as software or firmware) of the match engine 104. Alternatively, the Persist component 105 may be a database, a memory or another storage element. Additionally, the Persist component 105 may be computer hardware including a processor and a storage element.

Match Engine 104 communicates the existence of the new order and any implied orders that it created to the Ticker Plant 106 (reporting device) which in turn, communicates the new order and implied orders to the Market Data Server 107. Ticker Plant 106 (reporting device) occupies this position between the Match Engine 104 and the Market Data Server 107 and functions to aggregate data from multiple sources and communicate with components outside the electronic trading system 100, such as the Price Reporting System 110. Ticker Plant 106 (reporting device) may be implemented as an integrated component of the Match Engine 104. Alternatively, the Ticker Plant 106 may be computer software, firmware, or hardware, that is separate but in communication with the Match Engine 104 (as shown). The Market Data Server 107 may communicate market data to the client 109 in a variety of ways. For example, the market data may be sent to the Order Submission Point 102 for communication with the client over the same link as the execution report, or sent to a Market Data Distribution Server 108 that can communicate with any number of clients (not shown).

Those of skill in the art will appreciate that the operations of Match Engine 104 may be performed in more than one part of trading system 100 or in related systems. For example, the calculation of implied orders may be done by traders at their trading stations (not shown) in search of arbitrage opportunities between trading networks or match engines. It is also possible to perform these calculations outside the trading system 100 for the evaluation of possible trading strategies, for instruction, regulation or in the solution of other problems where trading is used as a model.

Figure 2:
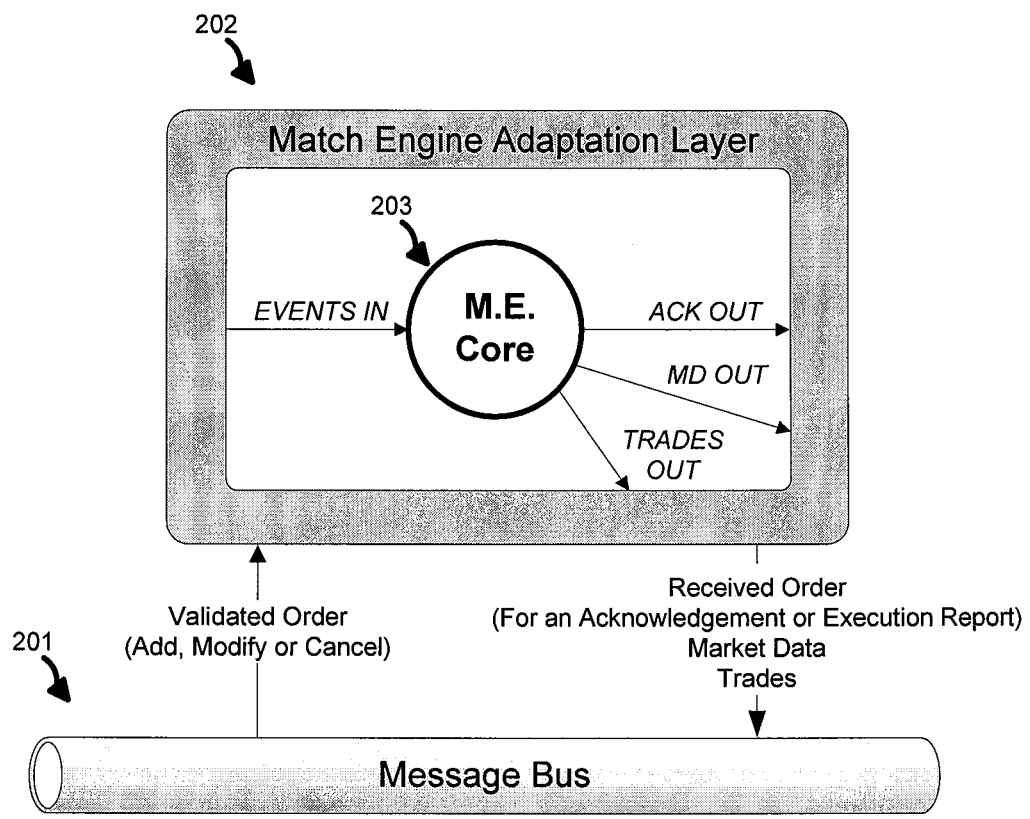
FIG. 2 illustrates an exemplary match engine architecture where the match engine is connected to other components of the trading network environment by a message bus.

FIG. 2 shows Match Engine 104 having a layered architecture and embodied on a computer including a processor and a memory. Match Engine 104 communicates with other components using a message bus 201. Incoming messages are translated by an Adaptation Layer 202 into events that can be processed by a Match Engine Core 203, sometimes referred to simply as the Core 203. The output messages from the Core 203 are translated by the Adaptation Layer 202 back into messages that can be transmitted to other parts of the trading system 100 using the message bus 201. The Core 203 contains the program code required to calculate implied orders. This program code is referred to as the Implicator or Match Engine Implicator. The Implicator uses graph theory, parallel processing and filtering of the implied market data to increase its speed of calculation, publishing and trading overall. Although this example includes the Implicator as part of Match Engine 104 in an electronic trading system 100, the Implicator can be used in any system where implied orders need to be calculated. An example of such a system is the client software used by a trader to receive market data and search for arbitrage opportunities on multiple electronic trading systems.

Those of skill in the art will appreciate that a Match Engine Core 203 and its Implicator may be implemented in a programming language such as Java or C++ that allows multiple threads of execution and that a program with multiple threads may be executed on a computing system with multiple central processing units (CPU). In such an implementation, if the program is correctly designed, the threads will execute in parallel and the time taken to execute all of the threads can be as short as the time taken by the single longest thread. If there are more threads than CPUs, then the execution time will depend on how many threads must be executed sequentially on each CPU. In FIG. 2, it is contemplated that the Core 203 will be implemented in such a language and that the calculation of implied orders by the Implicator will be accelerated by performing many independent calculations in parallel on separate threads.

An Implicator operates on a group of contracts referred to as an implication group. In futures trading, an implication group consists of outright contracts and combination contracts that can trade with each other. An outright contract is defined by a product and a delivery period, such as West Texas Intermediate Crude Oil delivered at Cushing, Okla. in the month of January 2008. A combination contract, also referred to as a strategy, may be defined as a combination of outright contracts where each outright forms a leg of the strategy. The definition specifies whether buying a unit quantity of the strategy requires a given leg to be bought or sold and in what quantity. Strategies may be defined by the exchange and advertised to traders as tradable instruments. Strategies may also be defined by users through a security definition request conveyed to the trading system using an appropriate protocol.

A simple combination contract found in many futures trading systems is the calendar spread, which is a contract to buy a product in one delivery period and sell it in another. The simplest possible implication group consists of two outrights and the spread therebetween. An exemplary implication group includes the outright contracts for a given product in two different delivery periods and the calendar spread contract between these two outrights.

It is possible to define combination contracts with any number of legs. Further examples of combination contracts include the intercommodity spread with two legs, the 3:2:1 ratio spread with three legs and the yearly strip with twelve legs. Any number of such contracts may be placed in an implication group so long as any combination contract that belongs to the group also has all of its outright leg contracts as members of the group. It is not necessary for every possible combination of the outright contracts to correspond to a tradable combination contract.

Examples of strategies that include legs having different volume ratios include, but are not limited to, the butterfly, the double butterfly, crack spreads, crush spreads, and other ratio spreads, which are discussed in detail below.

The foregoing definitions for futures may be readily extended to equities, options on equities, options on futures and other tradable instruments.

A butterfly consists of three legs referred to as the wing, the body and the (second) wing. A futures butterfly is typically defined with the wing, the body and the second wing in three successive delivery periods. A futures butterfly definition may be expressed using trading terminology as Buy1exp1 Sell2exp2 Buy1exp3. The double position in the middle is called the body, while the two other positions are called the wings.

The options butterfly, which is a typically used as an example because of its common use in volatility trading, is defined with the wing, the body and the second wing as options in the same product and delivery period but with different strike prices. The buy butterfly (long butterfly) call options spread includes a long call at a low strike price, (a long 1 call at (X−a) strike), a long call at a high strike price (long 1 call at (X+a) strike), and a short with twice the unit volume at the average strike price (short 2 calls at X strike). Buy butterfly spreads may also be formed with put options and may also be unbalanced, using different strike prices. A sell butterfly (short butterfly) takes the opposite position.

The double butterfly spread is simply two butterfly spreads joined together. The double butterfly futures spread uses four different expiries and may be expressed using trading terminology as buy1exp1 sell3exp2 buy3exp3 sell1exp4. The double butterfly options spread uses four different strike prices.

The crack spread involves a ratio of crude oil to the product (such as gasoline). Simple crack spreads involve only crude oil and a single distillate such as gasoline or heating oil. However, crack spreads are also defined in two-one-one, three-two-one, or five-three-two ratios of crude oil and two of its distillates.

A crush spread involves soybeans or other commodity and the products that can be made from the commodity (such as vegetable oil produced from the crushing of soybeans). A crush spread may be made at any ratio.

The crack spread and crush spread are specific examples of ratio spreads. A ratio spread is any strategy that involves buying some number of tradable instruments and selling a different number of other tradable instruments. The tradable instruments may have some common property and the ratio may be based on some relationship between the physical or financial products that the tradable instruments represent, but this is not required. For example, a ratio spread can be formed using options of the same underlying market (or another market) and (usually) the same expiration date, but of a different strike price. Ratio spreads may constructed in an infinite number of combinations. Any one of which could have legs different volume ratios and can be trade, along with other strategies or outright orders, using a trading path that traverses the trigger order more than once.

An example of a technique for defining implicable contracts and calculating the implied orders that can trade in such contracts can be found in U.S. patent application Ser. No. 12/032,379, which is incorporated herein by reference in its entirety. The modeling language and implication techniques described therein make use of graph theory, which is the study of mathematical structures used to model pairwise relations between objects from a certain collection. A "graph" in this context refers to a collection of vertices or "nodes" and a collection of "edges" that connect pairs of vertices. The type of graph used in the technique is sometimes referred to more specifically as a "directed graph," since each edge is defined with a source node and a target node, and is directed from the source to the target.

In an implementation, an edge corresponds to the best price level on a given side of a contract. The price of the edge is the price of the best level. The volume of the edge is the total volume of all the orders at the best price level. The time priority of the edge is the time priority of the first order to arrive, also referred to as the front-of-queue order. In addition, weighting factors may be applied to the price, volume and time priority of an edge in order to facilitate the calculation of properties associated with sequences of edges that are connected to form a path. For example, the prices of buy orders may be inverted so that the price of a buy order price and the price of a sell order that can trade with it sum to zero.

The price of a path is the sum of all the edge prices in the path. The path volume is the minimum volume of any of the path's component edges. The path time is the maximum time priority number of any of the path's component edges. This is the time priority of the order that "completes" the implied, i.e. the last component order to arrive in the Match Engine. The priority of a path is determined first by the price. If two paths have the same price, then the path with the earliest time priority is "shorter" (i.e. takes precedence) and is considered to be of higher priority. If two paths have the same price and time priority, then the path with the greatest volume takes precedence and is considered to be of higher priority. If all three properties are the same then, in the current implementation, the algorithm selects the first discovered path as being of higher priority. In another implementation, however, additional edge properties could be included in this algorithm for determination of the highest priority path.

Given that a price level may consist of multiple real orders arranged in a queue according to their time of arrival, volume, or other properties that determine their priority for trading and that an implied order is simply a path from one node to another whose price, time priority and volume are calculated as from the prices, time priorities and volumes of the component edges, it is understood that an incoming real order that trades against this implied order will actually trade against several chains of orders that form the same path. Each edge will have a front-of-queue order and the volume of the any trade cannot exceed the volume of the smallest front-of-queue order. If the incoming real order is greater in volume than the smallest front-of-queue order but less than the aggregated volume of the path, then successive trades are executed until either the input order or the implied path is eliminated.

An example of a technique for rapidly calculating such implied orders is given in U.S. patent application Ser. No. 12/350,788, which is incorporated herein in its entirety. The paths that take precedence (i.e. have the highest priority) between each pair of nodes are calculated using a collection of shortest path trees. There is a tree for each possible starting node where the starting node is at the root of the tree and all the reachable ending points are at the leaves. The collection of shortest path trees can be analyzed to determine which trees or nodes within a tree are affected by each newly arriving order. A new value for each affected tree can be calculated, wherein the calculation for each affected tree is allocated to an independent thread of execution either explicitly or through thread pooling. The new value calculations can be merged with identified implied orders and associated market data. The identified implied orders and market data can be reported in a message suitable for translation to external form.

Figure 3A:
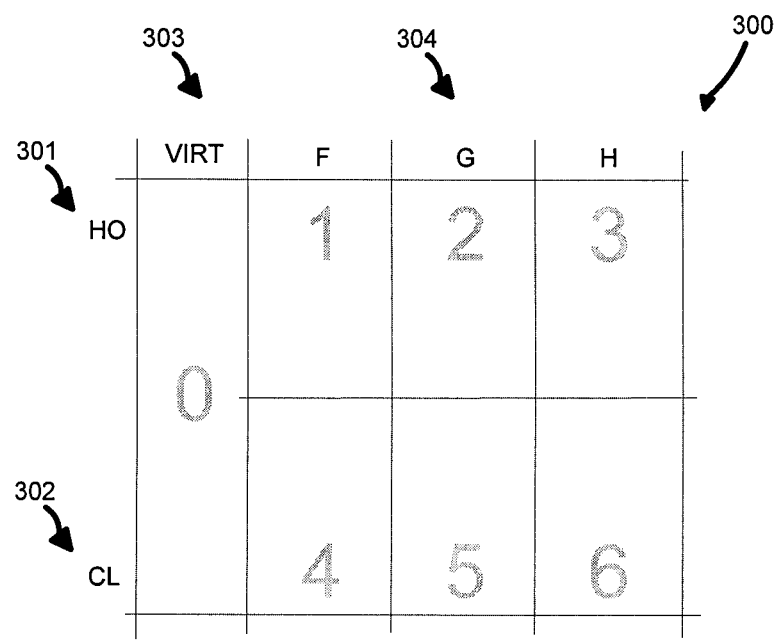
FIG. 3a illustrates a simple contract grid.
Figure 3B:
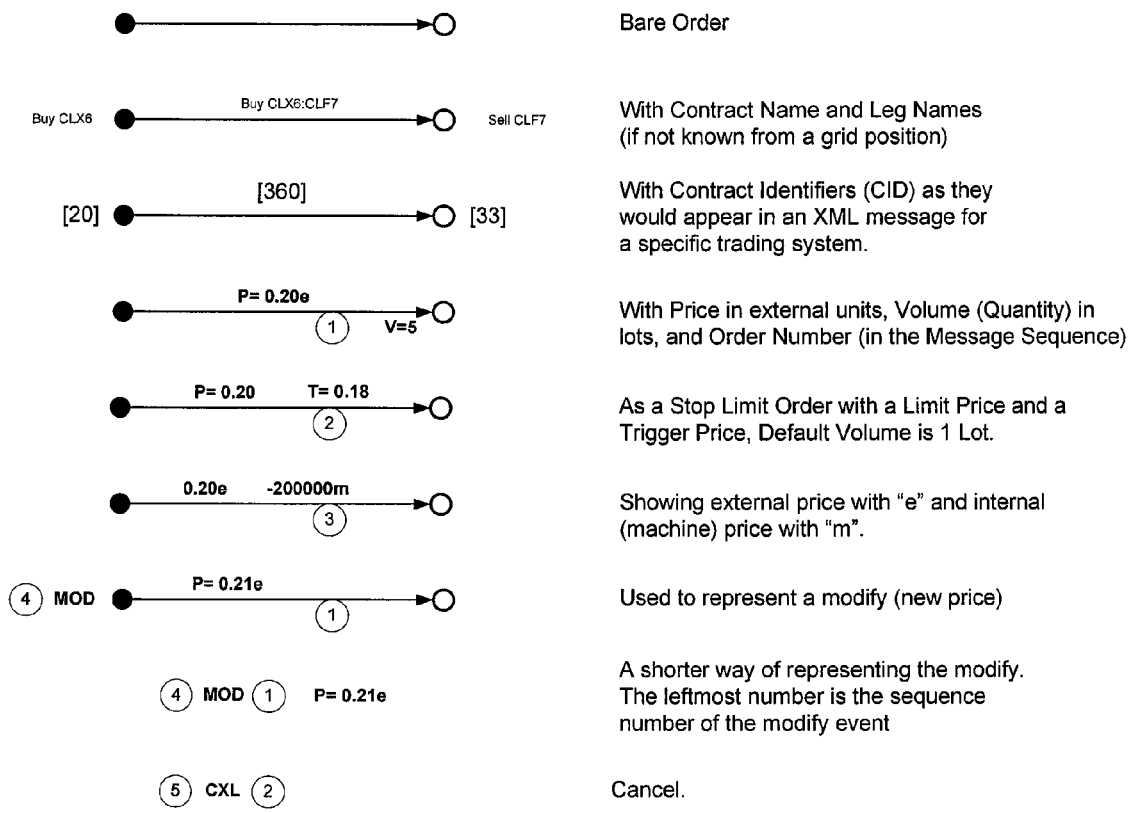
FIG. 3b illustrates exemplary order elements.

A visual Match Engine Modeling Language (MEML) as contemplated by U.S. patent application Ser. No. 12/032,379 includes a concrete syntax, an abstract syntax for constructing expressions in the language, a syntactic mapping for associating MEML expressions with elements of the trading system 100 and a semantic mapping to relate modeling language expressions to real-world business requirements. The contract grid shown in FIG. 3a is an example of an expression. The decorated order elements shown in FIG. 3b are also expressions. The syntactic mapping of the modeling language specifies how the data formats used by other components of the trading system can be translated into modeling language expressions.

The modeling language allows expressions to be combined. An empty grid represents the initial condition of Match Engine 104 after it has been started but before it has received any order data. The placement of a decorated order element adjacent to the grid indicates that the Match Engine 104 has received the corresponding data at its input. The placement of a decorated order element on the contract grid indicates that the order has rested in the Match Engine Core 203 and can trade with orders that might be received in the future. Other expressions in the modeling language can be used to express the operations required for trading orders and publishing market data. The Match Engine 104 itself is specified by a set of expressions in the modeling language that define the prior state, input, output and final state associated with every possible state and input. All of the operations that the Match Engine 104 can perform on the data that it has received and stored can be expressed as manipulations of the visual symbols in the modeling language and computations with the numerical and alphabetic data in the element decorations and on the grid.

In an implementation, the correspondence between the data formats used by other components of the trading system and the internal formats used by the Match Engine 104 is maintained in the Adaptation Layer 202 using data that the Match Engine 104 obtains from the trading system database at startup. The adaption layer associates contract identifiers in the external trading system with pairs of nodes in the graph defined by the contract grid in the Match Engine Modeling Language. The Adaptation Layer 202 associates external trading system prices in real world units such as barrels and gallons with machine prices in scaled units that are internal to the Match Engine Core 203 and common to all the contracts in the implication group.

In an implementation, the Adaptation Layer 202 applies a price conversion factor based on whether the order is a buy or a sell. Orders submitted by market participants, such as clients 109, as real orders may be either buys (bids) or sells (asks). The prices of these orders may be positive or negative, but in general a trade is possible when the bid is equal to or better than the asking price. When an order is placed on the contract grid, buys and sells are distinguished by their starting and ending points. The external price of a buy order is multiplied by −1 and the external price of a sell order is multiplied by +1 (i.e. no change) to express them as machine prices. As a result, the sum of the machine prices of two or more orders that can trade together will be equal to or less than zero.

FIG. 3a illustrates a simple contract grid 300 that may be utilized to illustrate an implication group. The implication group consists of two products: Heating Oil 301 designated by "HO" and West Texas Intermediate Crude Oil 302 designated by "CL". There are three delivery periods 304 designated by the generic months January ("F"), February ("G") and March ("H"). There is also a virtual node 303 as required by the graph theory representation of outright contracts as spread contracts between a virtual contract and an outright contract. In this way, real outright orders may be expressed as spreads between the virtual node and the node that corresponds to the product and delivery month that define the outright. In some implementations, a directional convention can be included whereby real outright sell orders correspond to the outgoing edges from this node. The nodes of grid 300 are numbered from 0 to 6 and the tradable contracts correspond to node pairs.

FIG. 4 lists and describes each possible node pair as a key to the graph theory representation of FIG. 3a. The node pairs are listed on the right and are matched with the corresponding contract symbol and general description of the contract. The presence of an edge is equivalent to the presence of tradable volume at a price level in the corresponding contract side. To simplify the exposition, the edges will be described as individual orders on the understanding that multiple orders at the same price level may be aggregated to obtain the total tradable volume at that level. Those of skill in the art will appreciate that new orders which can trade with resting orders must often have their volume allocated amongst multiple resting orders according to criteria based on price, volume, time of arrival, trader status and other factors, all of which can be accommodated with the techniques described herein. For example, an edge (not shown) from node 1 to node 4 could correspond to an order to buy January heating oil and sell January crude, which is a type of inter-commodity spread that would use the contract symbol HOF:CLF.

FIG. 4 lists 30 possible contracts that can be represented on the grid of FIG. 3a, it being understood that the limitation of crack spreads and intercommodity spreads to contracts with a common delivery period is intended as an example of current exchange practice and not an inherent limitation of the technique.

Figure 5:
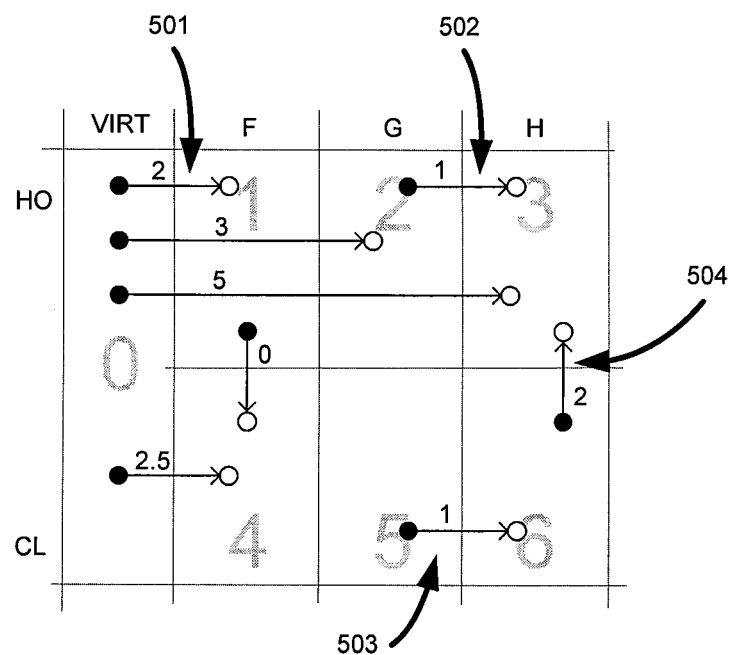
FIG. 5 illustrates the simple contract grid of FIG. 3a including eight exemplary orders.

FIG. 5 illustrates the simple contract grid of FIG. 3a including some exemplary real orders. For example, real order or trading edge 501 represents an outright order to buy heating oil (HO) with a January (F) delivery, edge 502 represents a calendar spread to buy February (G) heating oil and sell March (H) heating oil, edge 503 represents a calendar spread to buy February (G) crude (CL) and sell March (H) crude (CL), and edge 504 represents an inter-commodity spread to buy March (H) crude (CL) and sell March (H) heating oil (HO). Each of these orders are listed in the table of FIG. 4. It is understood that trading system 100 requires much larger grids for its implication groups.

Real orders for arbitrary outright and combination contracts can be expressed with directed edges on a graph. Implied orders in a specific contract can be calculated as the shortest path between the corresponding nodes. Various methods can be used to calculate the shortest paths including, without limitation: Floyd's algorithm, the Bellman-Ford algorithm, Dijkstra's algorithm and Johnson's algorithm. The method used to calculate the shortest path between nodes depends on the structure of the implication group and the distribution of orders among various contracts, and can be implemented with the algorithms most suited to the orders likely to be encountered.

Implementations described herein include techniques for minimizing the amount of computation required. Implementations use various properties of electronic trading to parallelize and prioritize the computations. FIG. 2 illustrates an exemplary implementation wherein, the communication between the Adaptation Layer 202 and Match Engine Core 203 is shown in terms of input events and output responses. Incoming events or orders are categorized into Implicator events depending on the changes they cause to a stored edge. Current implied markets are analyzed to determine which shortest paths will be changed by the changed edge and how much of each path needs to be recalculated. Independent subgroups of implied calculations are allocated to a number of independent threads of execution. Filter criteria are set to limit the reporting of implied orders to those of the greatest business value and to terminate the calculations as soon as these are found. Criteria are set for managing the execution of the independent threads on separate processors. The results are merged into a single message appropriate for translation by the Adaptation Layer 202 for publication as market data to other components of the trading system 100. Those of skill in the art will appreciate that the categorization, analysis, allocation, filtering, thread management and merging techniques do not depend on the specific form of shortest path calculation so long as there is a means of assigning shortest path trees or similar subgroups of implied market data to independent threads. The Implicator can take advantage of further innovations in this area as well as prior-art techniques such as those taught by U.S. Pat. Nos. 6,356,911 and 7,280,481, each of which is incorporated herein by reference in its entirety.

Figure 6:
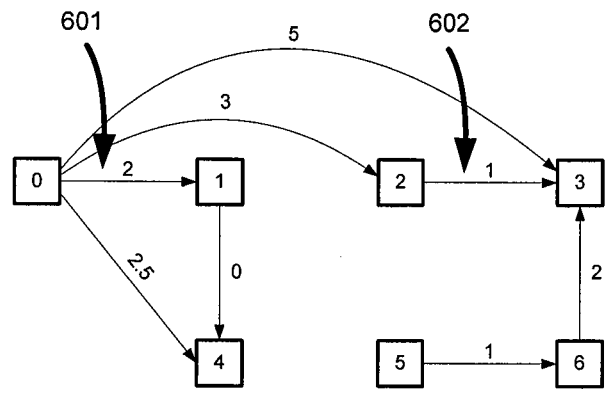
FIG. 6 illustrates an equivalent graphical representation of the eight exemplary orders of FIG. 5 without the details of specific contracts.
Figure 7:
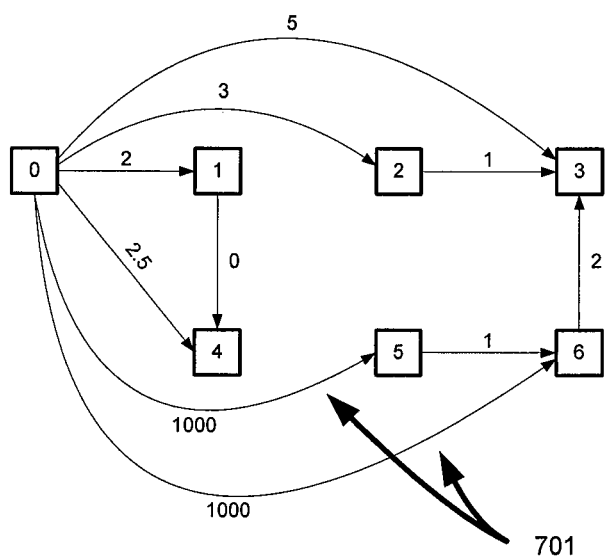
FIG. 7 illustrates the shortest path tree from node zero to all nodes in the contract grid.

FIG. 6 shows how the order graph of FIG. 5 can be represented more simply with numbered nodes and weighted edges. Order 501 in FIG. 5 is shown as edge 601 in FIG. 6 and order 502 in FIG. 5 is shown as 602 in FIG. 6. FIG. 7 shows the addition of sentinel-priced orders 701 to assign prices to unreachable nodes. The sentinel prices are defined as real prices that are much greater than any price that would be encountered in practice, such as $10,000,000.00 per barrel for oil. This technique allows absent edges to be identified with a simple price comparison, which is faster in execution and simpler to implement.

Figure 8:
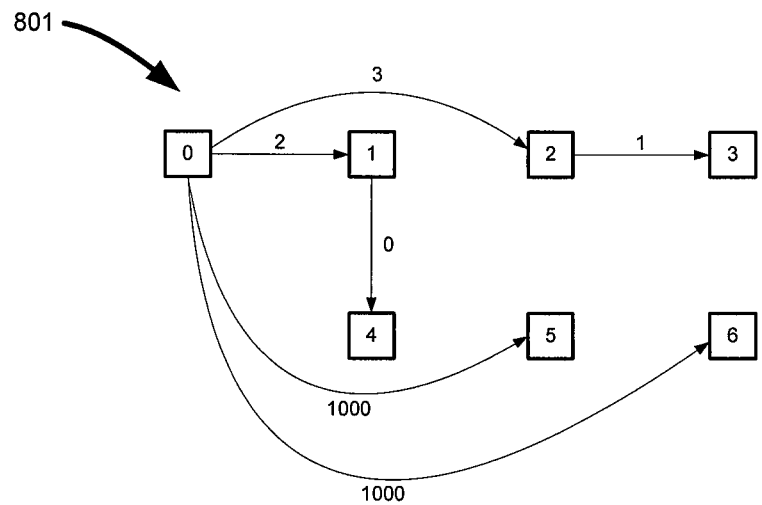
FIG. 8 illustrates the shortest path tree (SPT) as it might be computed by the Bellman-Ford algorithm, along with a numerical representation of the tree structure and the weights of the nodes.

FIG. 8 shows the shortest path tree 801 that would result from the application of the Bellman-Ford algorithm or an equivalent single-root shortest paths algorithm to the graph of FIG. 7. The spt[j] one-dimensional array 802 contains the predecessor of each node in the tree (i.e. node j is preceded by node spt[j]) and the wt[j] one-dimensional array 803 contains the node weights (i.e. wt[j] is the sum of the edge prices between virtual node 0 and node j along the shortest path). It is understood that the sentinel price of 1000 is intended purely for illustration and that in an implementation, the sentinel price would be much greater than any actual price but still within the range of numbers that can be handled by the computing system without causing an overflow.

When the contracts in the implication group are limited to outrights and simple 1:1 spreads, then the simple shortest path tree contains all of the data required to calculate implied orders and execute trades with incoming trigger orders. In general, the implied order computed as the path from the root node to a given node in the tree can trade with an incoming trigger order that, if it were added to the graph, would create a zero or negatively priced cycle consisting of the path from the root node to the given tree node plus the trigger order as the edge returning to the root. Expressed differently, the trigger order is only needed at one position in the trade cycle and the implied order computed from the resting orders is exactly the opposite of a hypothetical trigger order that would trade the most volume at the best price.

When the contracts in the implication grid can contain three or more legs or where the legs have different volume ratios, then the simple shortest path tree may not suffice for calculating the implied volume.

Figure 9:
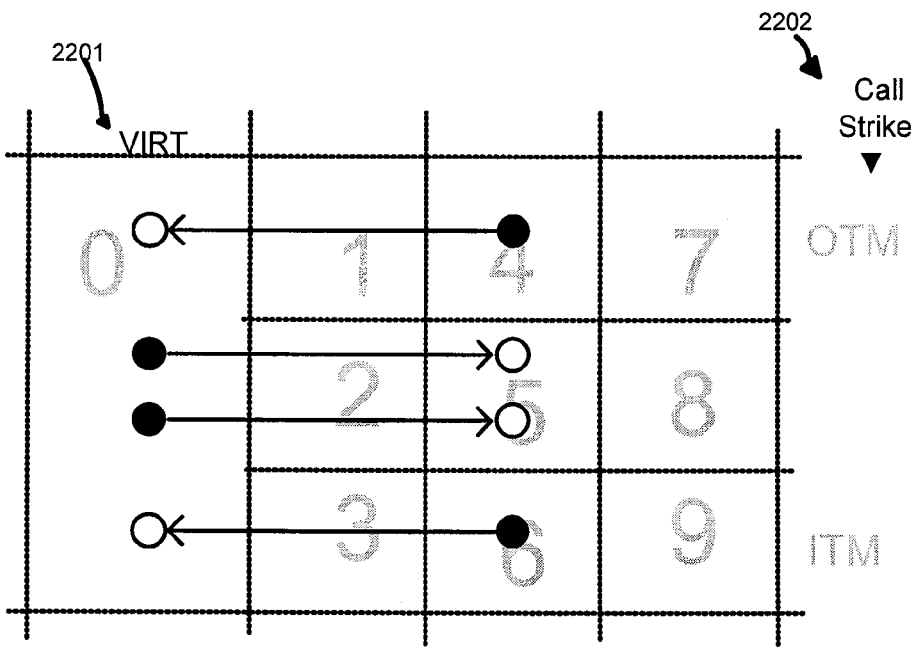
FIG. 9 illustrates a contract grid including the four outright orders of a butterfly spread.

Contract grid 2201 shown in FIG. 9 is similar to the contract grid 300 shown in FIG. 3*a*. However, in FIG. 3*a* the horizontal rows represent different products, specifically Heating Oil (HO) and Crude Oil (CL). In FIG. 9 the horizontal rows represent different strike prices defined for call options on futures in a single product which has not been specified. In both FIG. 3*a* and FIG. 9 the vertical columns represent different delivery periods. The expiry date of the option on the future is associated with the expiry date of the future itself and therefore with the delivery period. In order to simplify the exposition, the strike prices are identified generically as OTM (out of the money) and ITM (in the money) on the understanding that the middle row is at the money.

The example shown in FIG. 9 is a call butterfly. To take a long position in the call butterfly, the trader buys the wings and sells the body. In this example, the buy orders make up the wings and the sell orders make up the body. Contract grid 2201 includes the four outright orders associated with the long options butterfly. A first buy order drawn as an edge from node 4 to virtual node 0, a second buy order drawn as an edge from node 6 to virtual node 0, a first sell order drawn as an edge from virtual node 0 to node 5, and a second sell order drawn as an edge from virtual node 0 to node 5. The butterfly illustrates the techniques required for multiple leg contracts with different volume ratios in the legs.

Figure 10:
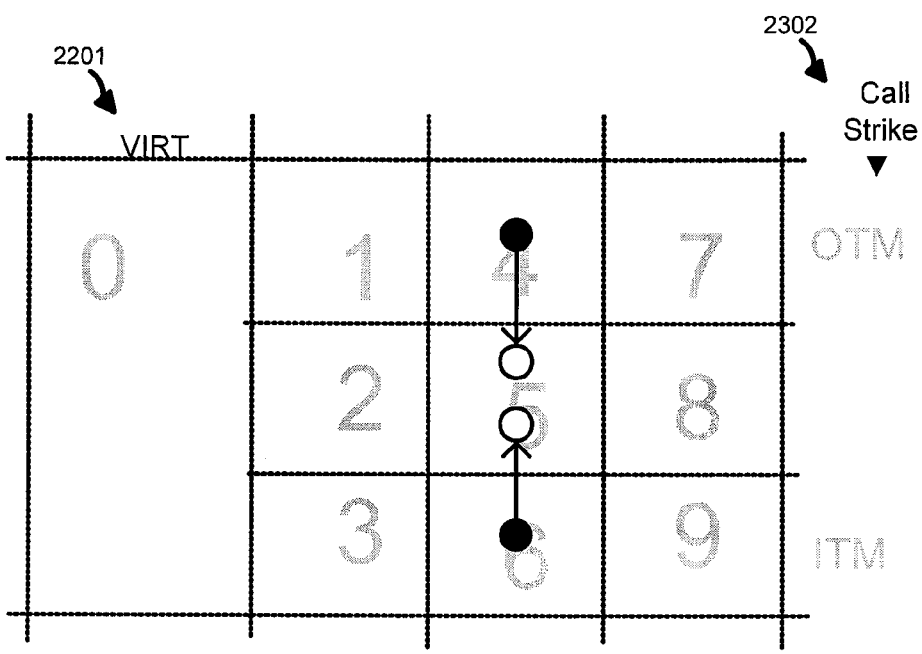
FIG. 10 illustrates a minimal form of the butterfly spread of FIG. 9.

The representation shown in FIG. 9 is referred to as a maximal form. Every strategy definition has a maximal form, and the maximal form of each individual strategy is unique. The maximal form of a strategy expresses the orders as a collection of unit volume buy and sell outrights. In other words, as shown in the example of the call butterfly of FIG. 9, each strategy is converted to its outright legs and the volume ratios are converted to multiple legs of unit volume. In order for the Match Engine 104 to compute all the possible implied volume using the graph theory technique, a system must be in place to reduce strategies to one or more minimal forms. A minimal form of a strategy expresses the orders as a collection of 1:1 spreads with integer volumes. FIG. 10 illustrates the minimum form of the call butterfly of FIG. 9. Contract grid 2300 includes two spread orders. The first spread order, drawn as an edge from node 4 to node 5, is a simplification of the first buy order drawn as an edge from node 4 to virtual node 0 in FIG. 9 and the first sell order drawn as an edge from virtual node 0 to node 5 in FIG. 9. The second spread order, drawn from node 6 to node 5, is a simplification of the second buy order drawn as an edge from node 6 to virtual node 0 in FIG. 9 and the second sell order drawn as an edge from virtual node 0 to node 5. The butterfly has only a single minimal form. Other strategies, such as the condor and the double butterfly, have two minimal forms.

Arbitrary strategies, such as those defined by users, may have any number of minimal forms. The Match Engine 104 can calculate the complete set of minimal forms for each strategy that will take part in implied market calculations and create the nodes and edges required to represent these forms internally. When calculating implieds (implied orders), the Match Engine 104 selects the form that gives the best price, time, or other business priority. If the two forms are equal in terms of business priority then the Match Engine 104 can assign a technical priority by form number so that the trades can be calculated in a definable sequence.

In the foregoing discussion, the buy and sell orders placed on the grid were only connected in the business sense that all of them would have to be executed in order for the trader to buy the call butterfly. In a Match Engine 104 with full implication, these orders must be linked together so that collectively they imply a buy order in the call butterfly where the call butterfly has been defined as a tradable instrument in its own right. The implied buy call butterfly can be published in the market data and the implied buy order can trade with an appropriately priced sell order if and when such an order is entered by a trader.

Figure 11:
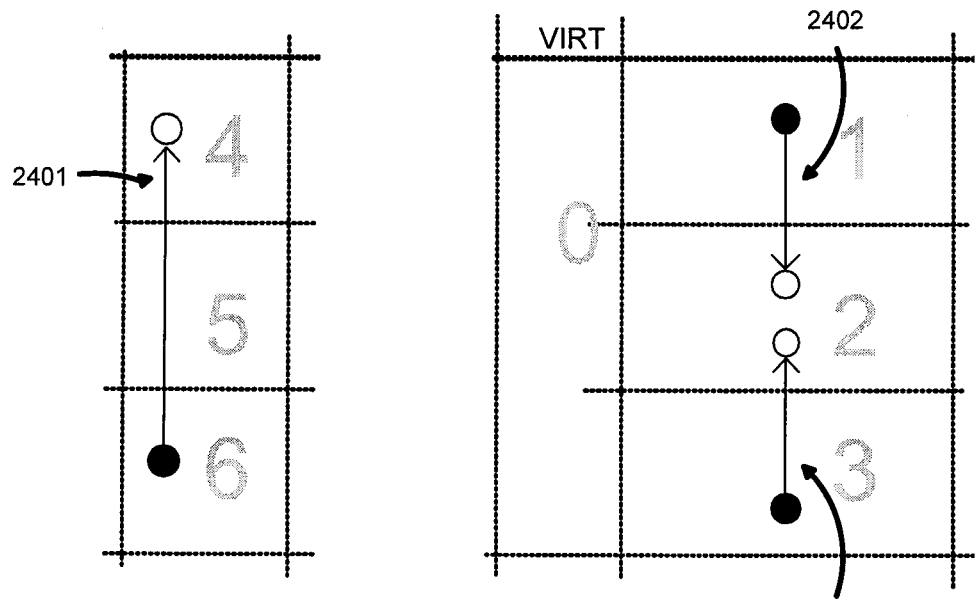
FIG. 11 illustrates a real sell butterfly spread order using another graphical representation.
Figure 12:
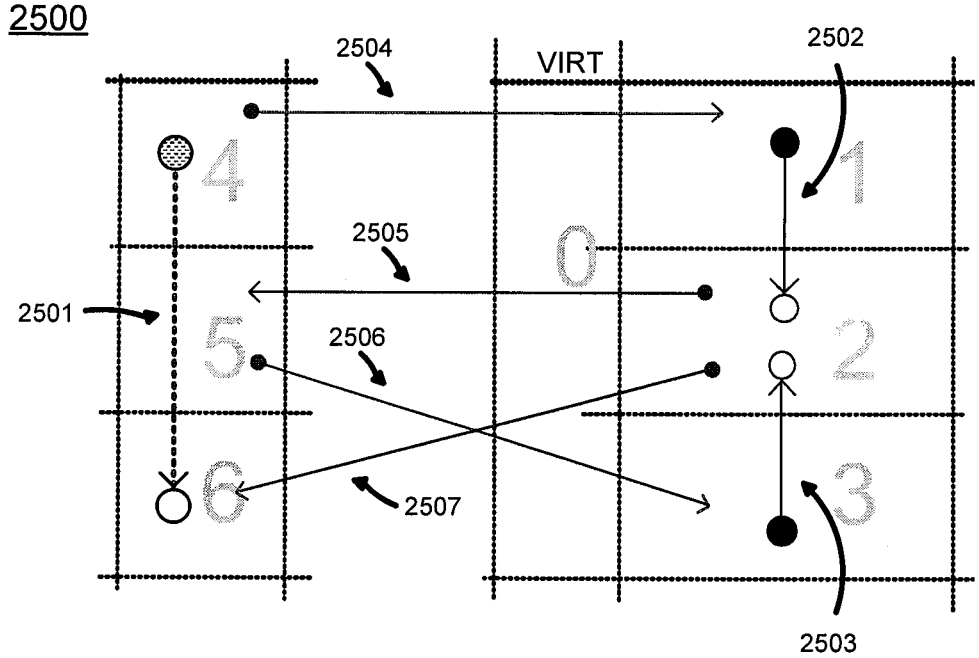
FIG. 12 illustrates the implied buy butterfly spread order the butterfly helper orders that allow it to trade with the sell butterfly spread order of FIG. 11.

FIG. 11 and FIG. 12 illustrate the technique used in the Match Engine Modeling Language to impose the linkage. For simplicity, the unused column in FIG. 9 and FIG. 10 have been dropped and the nodes renumbered. Nodes 0, 1, 2 and 3 are needed to define the call options for a single delivery period and three distinct strike prices. Strictly speaking, virtual node 0 is not required at this point but it is convenient to maintain the convention that the virtual node is always identified as virtual node 0. Nodes 4, 5 and 6 will be used to represent the call butterfly.

FIG. 11 is drawn in such a way that the sell butterfly order 2401 and the two spread orders 2402 and 2403 form a tradable cycle. The sell butterfly order 2401 is associated with edge 6-4. When the sell butterfly order 2401 from node 6 to node 4 is removed, the remaining orders should form a path from node 4 to node 6 in order to imply the opposite of the removed order. This is accomplished in FIG. 12 by adding helper orders 2504, 2505, 2506 and 2507. The two spread orders 2402 and 2403 along with helper orders 2504, 2505, 2506 and 2507 imply the buy butterfly order 2501, is associated with edge 6-4. This follows the general convention that buy orders should connect a lower numbered node with a higher numbered node except when one of the nodes is the virtual node 0. It should be noted that in the examples of FIGS. 11 through 16, the virtual node 0 is not utilized in the examples shown because no outright orders are present. Of course, outright orders could be involved in the grids shown, which would involve use of virtual node 0.

Helper orders, in general, express the relationships between contracts in a combination product. They have zero price, infinitely early time and infinite volume. They have the unique property that all the helper orders associated with a combination must be present in an implied order that contains the combination as a component. The function of the helper orders is to enforce the logical "anding" of trades in all the legs by requiring all the orders to be traversed before an implied is created.

Figure 13:
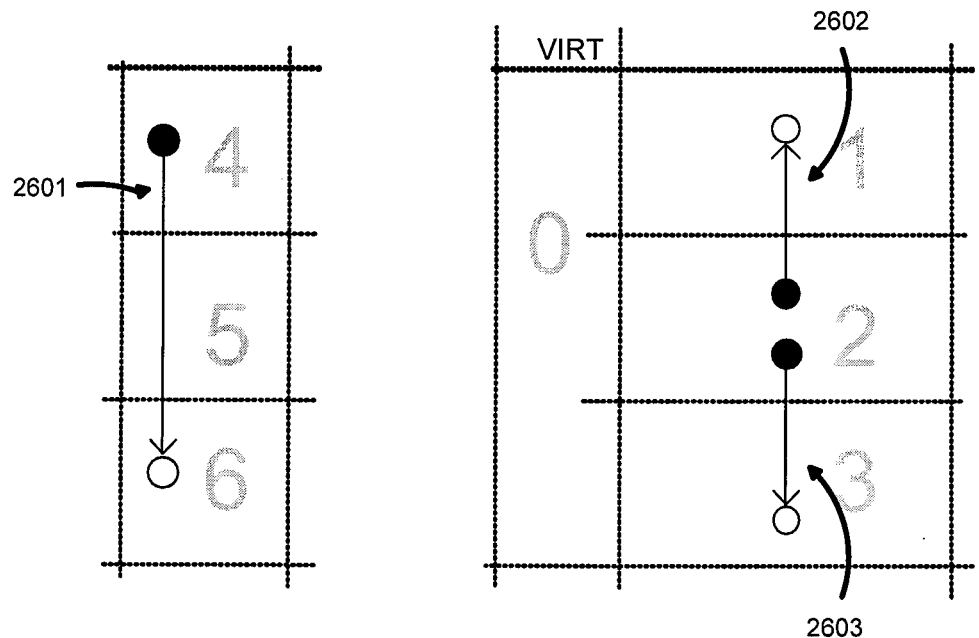
FIG. 13 illustrates a real buy butterfly spread order.
Figure 14:
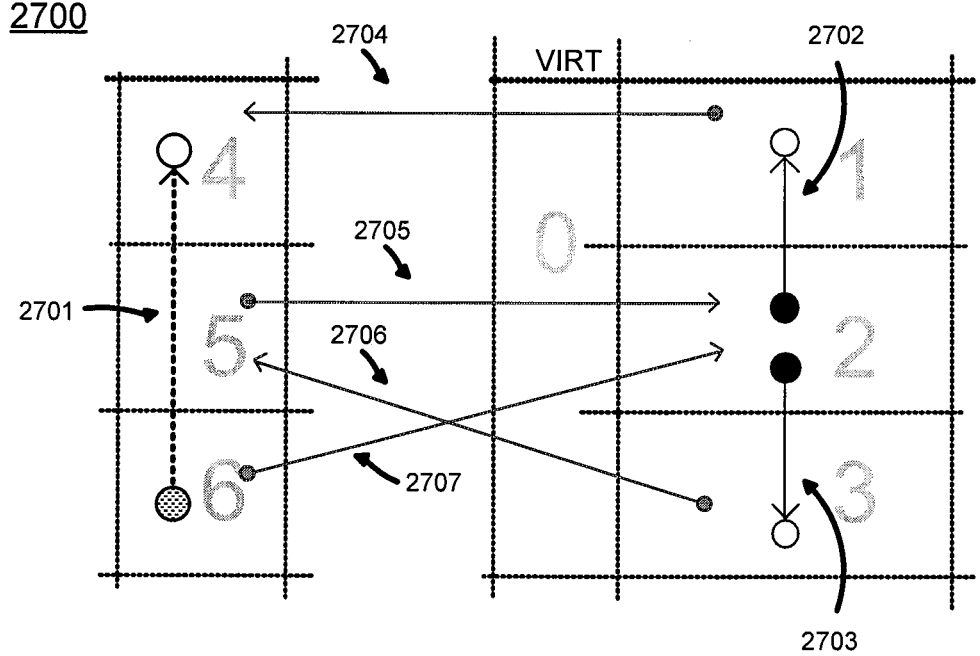
FIG. 14 illustrates an implied sell butterfly spread order and the helper orders that allow it to trade with the buy butterfly spread order of FIG. 13.

A similar procedure is illustrated for the implied sell butterfly in FIG. 13 and FIG. 14. In FIG. 13, the real buy butterfly 2601 forms part of a trade cycle with real option spreads 2602 and 2603. In FIG. 14, the real buy order has been removed and the opposing sell butterfly 2701 is implied by the remaining real orders 2702 and 2703. The helper orders 2704, 2705, 2706 and 2707 have been added to express the requirement that both the real orders must be present in order to trace a path from node 6 to node 4. The helper orders for the implied sell in FIG. 14 are the "opposites" of the helper orders for the implied buy in FIG. 12. In the modeling language, these are typically shown as "blue helpers" for the implied buy and "red helpers" for the implied sell, following the common industry practice of associating "buy" with "blue". When the Match Engine 104 creates the nodes and edges required to implement the calculations specified in the modeling language, the edges associated with helper orders are labeled as being either red or blue. In an implementation, the shortest path algorithm eliminates potential branches from the shortest path tree if they would include a red and a blue helper from the same strategy, since a shortest path cannot contain both the buy side of a contract and the sell side of a contract in the same path.

In FIG. 12, the buy butterfly 2501 is implied by options spreads 2502 and 2503. A path can be traced from node 4 to node 1 (traversing helper order 2504), from node 1 to node 2 (traversing one spread of the buy butterfly), from node 2 to node 5 (traversing helper order 2505), from node 5 to node 3 (traversing helper order 2506), from node 3 to node 2 (traversing the other spread of the buy butterfly) and from node 2 to node 6 (traversing helper order 2507). It should be noted that helper orders are used to express a "logical and" operation, also referred to as a "logical product" or "Boolean product". This operation is commutative in the sense that "A and B" has the same value as "B and A" and associative in the sense that "A and (B and C)" has the same value as "(A and B) and C". As such, it is possible to express the requirements for implying a strategy in a minimal form with more than one arrangement of helper orders. It is also possible to define helper orders with the property that they be traversed a specific number of times. The transformation of logical expressions and the translation of these expressions into sequences of helper orders will be apparent to those of skill in the art.

The algorithms for constructing shortest path trees with conventional edges can be extended to include helper orders. In the simplest extension, the helpers are treated as zero-price, infinite volume, infinitely early orders with no special constraints. When the unconstrained shortest path tree has been calculated, each path is retraced to the root to confirm that it contains either no helper orders or a complete set of helper orders for each strategy that appears in the path. If the arrangement of helper orders makes it possible for a node to be visited more than once in the construction of a valid shortest path, then the tree representation must be extended to allow this. Instead of each node in the tree having a single predecessor as shown in FIG. 8, a node may have a different predecessor for each position it has in the path. This can be easily recorded by adding another dimension to the spt[j] matrix 802 or by "cloning" the object used to represent the node in an object-oriented graph representation as might be used in a programming language such as Java or C++. Although these algorithm extensions increase the amount of data required to represent the tree, those of skill in the art will appreciate that a variety of techniques can be used to prevent the construction of tree branches that have no possibility of being valid or to otherwise increase the efficiency of the calculations.

The Match Engine 104 operates on the principle that after it has received an order and computed all of the possible trades, the graph will not contain any tradable cycles. In all of the previously discussed examples of implied order calculation, the Match Engine 104 could calculate the implied orders by finding valid shortest paths between the nodes associated with the orders to be implied. The inherent assumption in this procedure is that the trigger order plus the implied will form a tradable cycle and that the trigger order is used only once in returning from the end of the path back to its root. In some trading scenarios, however, the arrangement of helper orders can make it necessary for the trigger order to be traversed more than once. This can occur when the helper orders for a given strategy are arranged in such a way that two or more of the helper orders begin or end in a common node, as they do in strategies where the legs that have different volume ratios. In other words, one leg of the strategy requires a different quantity than another leg of the strategy. The calculation of implied orders that include such strategies cannot be done with the simple shortest path trees used in the previous examples.

Examples of strategies that include legs having different volume ratios include, but are not limited to, the butterfly, the double butterfly, crack spreads, and crush spreads.

Figure 15:
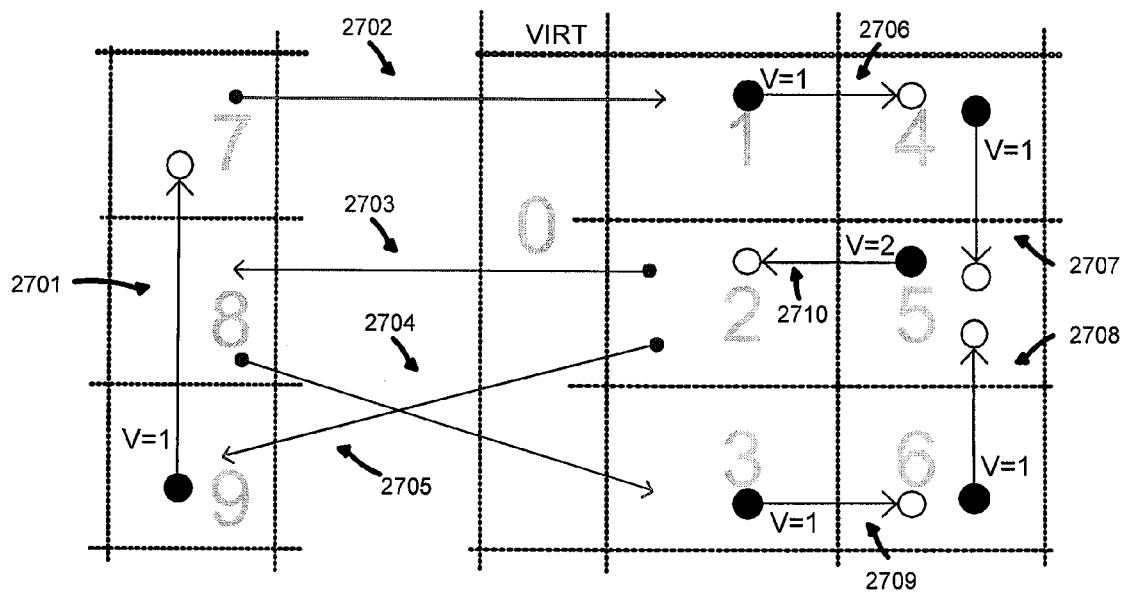
FIG. 15 illustrates a contract grid similar to that of FIG. 14 but with an additional delivery period, with orders in a tradable cycle that requires an order to be traversed twice.

FIG. 15 illustrates contract grid 2700 including sell butterfly 2701, helper orders 2702-2705, vertical spreads 2707 and 2708, horizontal spreads 2706 and 2709 and horizontal spread 2710. A tradable cycle could be formed that traverses edge 2810 twice. An example of that tradable cycle is the cycle that passes through nodes 1-4-5-2-8-3-6-5-2-9-7-1. The 5-2 edge 2710 has been traversed twice. It should be noted that the 5-2 edge 2810 includes two unit volumes and the remaining edges in the tradable cycle include one unit volume. If any of the orders that make up this cycle are removed from the graph, other than order 2710, it is possible to trace a path through the remaining real orders and the helper orders to create an implied order that would trade with the removed order if it were reintroduced as a trigger order. If order 2710 is removed, however, it is impossible to trace a path from node 2 to node 5 using only the resting orders and the helpers.

Figure 16:
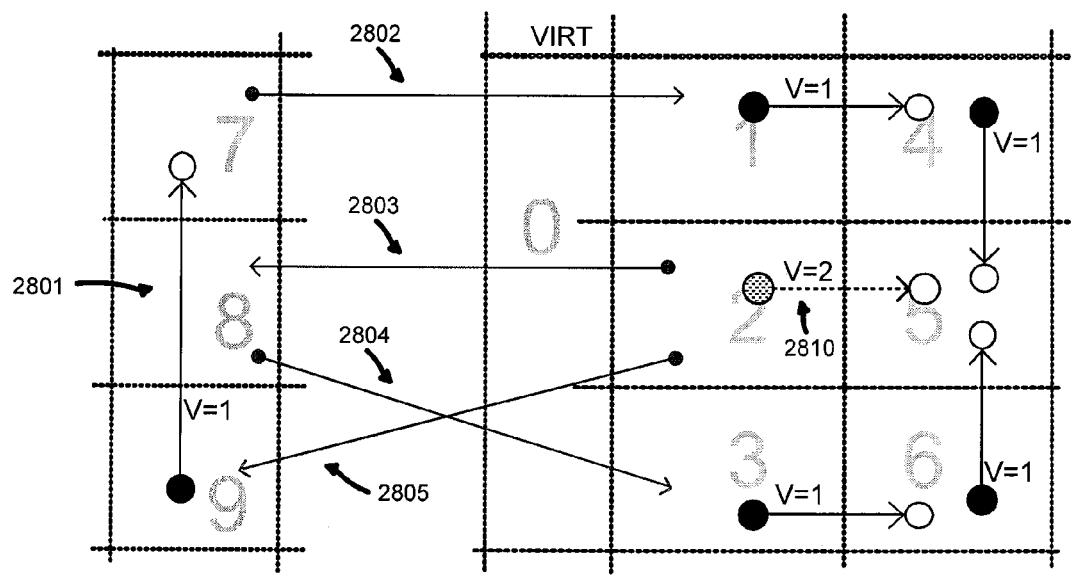
FIG. 16 illustrates the contract grid and orders of FIG. 15 with an opposing implied order in place of the order that needed to be traversed twice.

FIG. 16 illustrates the contract grid 2800 with the same orders as contract grid in FIG. 14 but with order 2810 removed. In its place is implied order 2810 in the opposite direction. The general principle that the remaining orders imply the opposite of the removed order continues to apply. Those of skill in the art will appreciate that if the Match Engine 104 does not calculate this implied and allows an incoming order like 2710 to rest without trading, then the graph will contain a zero or negatively priced cycle that can prevent certain shortest path algorithms from functioning correctly.

It will be apparent to those of skill in the art that the trigger order that trades with implied order 2810 must have a quantity of at least two lots and that if the resting orders were of larger quantity then the trigger order would trade in increments of two lots. Note that the volume of the implied order 2810 is for two lots even though none of its components have more than one lot present, another area where the calculation of this kind of implied will be different from the simple shortest path tree calculation described earlier. Those of skill in the art will appreciate that prior art Match Engines have implemented "all or nothing" or "fixed volume increment" conditions for real orders so that market data is published or trades calculated only when the required volume is available. Such conditions can also be attached to the implied order 2810 once it has been calculated.

Figure 17:
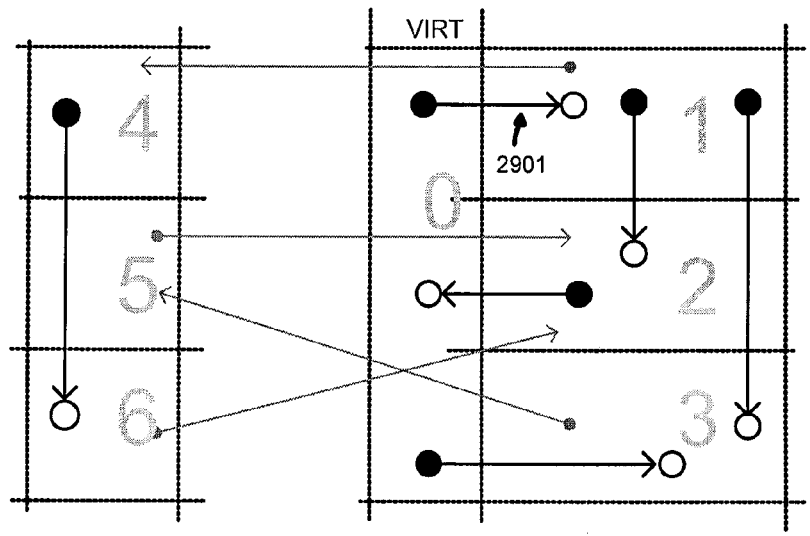
FIG. 17 illustrates a simplified contract grid with orders where there is more than one tradable cycle.

In an implementation, the Match Engine 104 does not calculate and publish implieds that require multiple passes through the trigger order prior to receiving the order. When a trigger order arrives however, it is not only compared against the previously calculated implieds but also checked for tradability in paths where the trigger order itself would require multiple passes. It should be noted that although FIG. 15 and FIG. 16 illustrate a scenario where the possibility of multiple passes is suggested by the presence of multiple helpers leaving the starting point of the path at node 2, FIG. 17 illustrates a scenario where more than one order requires multiple passes and where the order 2901 assumed to be the trigger does not connect nodes with multiple helpers. An indication that multiple passes may be required is the presence of a strategy where two or more helpers start or end. In order to avoid the burden of testing every possible trigger order for the possibility of a multiple pass implied, the Match Engine 104 waits until an actual trigger order has arrived. The Match Engine 104 adds the trigger order to the graph and includes it in the calculations as a "trading edge".

Figure 18:
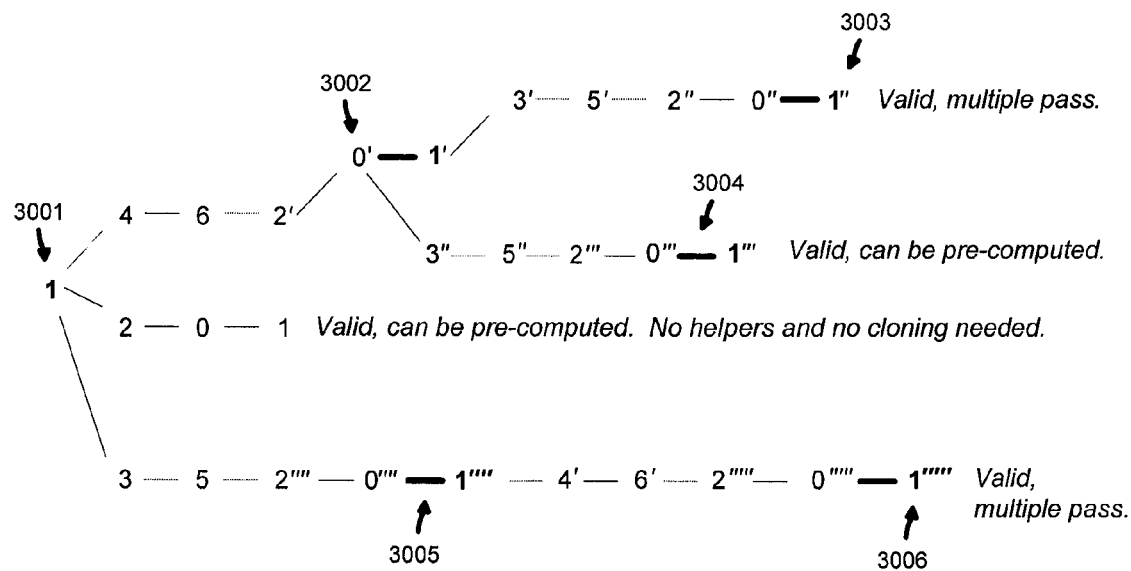
FIG. 18 illustrates a search tree generated in the course of searching for a tradable cycle in FIG. 17, where cloned nodes are used to record visits to a node before all the relevant helper orders have been traversed.

FIG. 17 and FIG. 18 illustrate how a trigger order is added to the graph and how the shortest path algorithm is extended to finding the shortest valid path from the end node of the trigger order back to its starting node where the trigger order itself may be included at an intermediate position in the path where not all of the helper orders for a strategy have been traversed. Contract grid 2900 shows a simple implication group. In addition to the outrights 1-0, 2-0 and 3-0, there are three possible vertical spreads 1-2, 1-3 and 2-3 as well as the butterfly 4-6. The example shown utilizes vertical spreads 1-2, vertical spread 1-3, and butterfly 4-6 but not vertical spread 2-3. Prior to the arrival of trigger order 2901, contract grid 2900 is assumed to contain all of the other orders shown. Trigger order 2901 will form a 0-1 edge, so the implied orders that it can trade with will therefore have to form a path from node 1 back to virtual node 0. There are two implied orders that can be pre-computed, specifically the path 1-2-0 and the path 1-4-6-2-0-3-5-2-0, where the second path requires two passes through the 2-0 edge but can still be computed with the resting orders and their helper orders alone.

FIG. 18 illustrates part of the tree that can be constructed in the search for a path from node 1 to virtual node 0 that can be extended with a final pass through the trigger order 2901 back to node 1. It is understood that an actual search tree would contain more branches and that these have been removed from the diagram for the sake of simplicity. The search begins at the root 3001 which in this case is node 1. There are three outgoing edges from node 1, specifically 1-4, 1-2 and 1-3. The search then continues outward from nodes 4, 2 and 3. The example has been constructed so that each of these nodes has only one outgoing edge, so the next level of the tree consists of the nodes 6, 0 and 5. When a node is visited more than once, each successive visit "clones" the node so that its predecessor can reflect the new way in which it was reached. The clones are shown in the diagram by adding the prime symbol as a superscript to the node number. In the upper tree branch indicated by 3002, virtual node 0 is reached without all of the helpers for the butterfly having been traversed. There are two possible outgoing edges. On the upper branch, the trigger order, corresponding to a 0-1 edge, is added to the search tree and the root node is cloned to indicate that at this point in the path it can have a predecessor. The search along this branch continues and ultimately arrives at virtual node 0 for a second time with all of the helpers traversed. The trigger order completes the cycle back to the root 3003. The search tree is also expanded along the 0-3 edge and continues until virtual node 0 is found again. At this point all of the helpers have been traversed and the trigger order completes the cycle back to the root 3004. Finally, a similar search conducted along the lower branch results in a potential trade cycle with two passes through paths 3005 and 3006, each of which correspond to trigger order 2901. The match engine assigns a priority to each of these cycles based on their price, time priority, available volume or other criteria. The cycle with the highest priority is traded and the procedure repeated until no further trading is possible.

It is understood that the procedure shown is very general and that various improvements would be evident to those of skill in the art. For example, the path from 3001 to 3003 contains exactly the same orders as the path from 3001 to 3006. This is a natural consequence of the logical "and" being commutative as previously mentioned. Thus, cloning the root on one branch of the search tree makes it unnecessary to clone the root on every other branch. These properties of the order graph along with generally known techniques for searching can be employed to make the calculation of potential trade cycles more efficient.

In an alternative implementation, the Match Engine 104 considers every possible trigger order and calculates the implieds that would result if that trigger order were present and available for multiple passes. Those of skill in the art will appreciate that such a Match Engine 104 would be of value for analysis, testing or other applications even if it could not calculate these implieds at the rate needed for an actual trading system.

Figure 19:
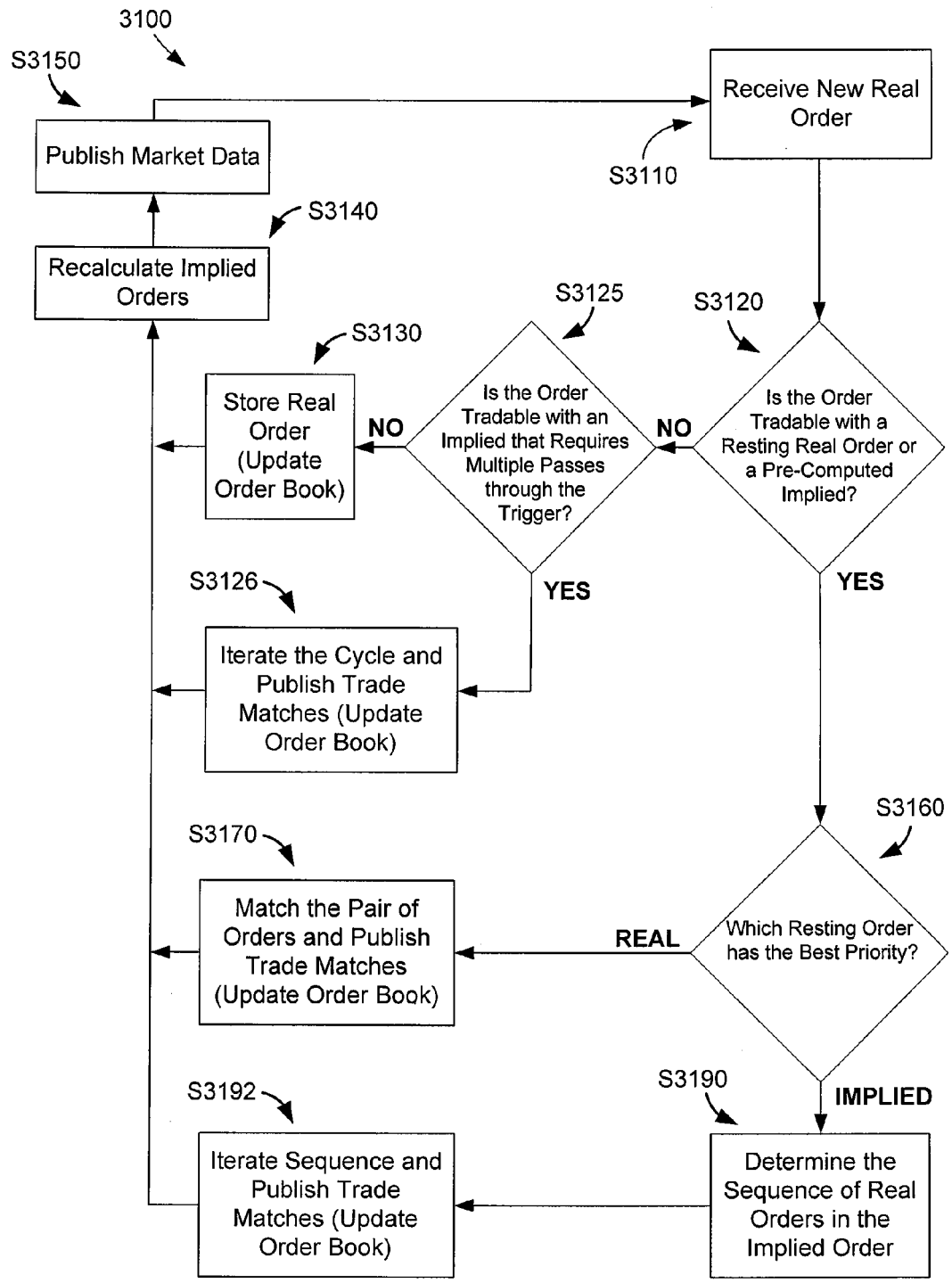
FIG. 19 illustrates a method for providing an implied order in an electronic trading system.

While not illustrated, it should be appreciated that the same trading edge may be traversed three, four, or any number of times. An exemplary implementation includes a computer implemented method of providing an implied order in an electronic trading system. With reference to FIG. 19, a match engine starts in a state where it contains no orders and then executes the procedure 3100 until it receives a message or other instruction to stop receiving and trading new orders. It is understood that the term "receive new real order" includes all order-related messages that can alter the state of the order book, for example order modifications and cancellations. It is further understood that the match engine may wait at this step until the order is received.

After startup, the match engine receives a first real order at step S3110, determines that it is not tradable at steps S3120 and S3125, after which the order is stored at step S3130. The implied orders are recalculated at step S3140 although with only the first order present there will be no implieds yet. The real market data from this first real order, is published at step S3150, after which the match engine waits until it receives the next order-related message. As additional orders are received, a test is made at step S3120 to determine whether the order is tradable against an implied that was calculated prior to receiving the new order. If so, it may be tradable against a resting real order as in step S3170 or a resting implied order in step S3190 and S3192. If not, it must still be tested to determine whether it could be traded in a cycle that requires multiple passes through the trigger. In this situation the calculation proceeds as shown in FIG. 17 and previously described. In all of the cases where trades are possible, the trades are calculated and the order book is updated. Updating the order book corresponds to changing the properties of one or more edges in the graph, such as their prices, volumes or time priorities. In the step S3140, the implied orders are recalculated. In other words, the shortest paths between all of the pairs of nodes that correspond to tradable instruments are recalculated. These paths, which have prices, volumes and time priorities that depend on the properties of their component edges, are stored in a manner that facilitates the comparison of the implied price and volume with the price and volume of an incoming trigger order. At step 3150, the real and implied market data, if any, is published to the users of the trading system.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer implemented method of computing implied orders in an electronic trading system, the method comprising:

receiving a first real order;
    receiving a second real order;

determining whether a first tradable combination can be formed including at least the first real order and the second real order;

executing, if the first tradable combination can be formed, a trade associated with the first tradable combination, using the electronic trading system;

adjusting, if the first tradable combination can be formed, at least one property of the first real order and the second real order;

calculating, if the first tradable combination can be formed, one or more first implied orders from the real orders after the at least one property has been adjusted;

calculating, if the first tradable combination cannot be formed, one or more second implied orders;

outputting either the first implied orders or the second implied orders to the electronic trading system;

receiving a third real order;

identifying, by an automated programmed computer, a second tradable combination including at least the first real order, the second real order, and the third real order, wherein the third real order is matched two or more times in the second tradable combination, wherein at least one of the first real order and the second real order comprises a plurality of legs at different volume ratios; and executing a trade associated with the second tradable combination using the electronic trading system.

2. The computer implemented method of claim 1, further comprising:

outputting the trade associated with the first tradable combination; and outputting the adjusted properties of at least one of the first real order and the second real order.

3. The computer implemented method of claim 2, further comprising:

adjusting the properties of the first real order, the second real order, and the third real order, used in the trade associated with the second tradable combination;

outputting the trade associated with the second tradable combination;

outputting the adjusted properties of at least one of the first real order, the second real order, and the third real order; and calculating at least one third implied order that can be calculated from one or more of the first real order, the second real order, and the third real order.

4. The computer implemented method of claim 1, wherein the at least one property comprises trade volume.

5. The computer implemented method of claim 1, further comprising:

generating an execution report including at least one of the first tradable combination or the second tradable combination.

6. The computer implemented method of claim 1, further comprising:

translating data associated with at least one of the first real order, the second real order, and the third real order according to syntactic mapping of a modeling language.

7. The computer implemented method of claim 6, wherein the modeling language represents tradable instruments with nodes and edges in a graph and the calculating of tradable combinations of orders in these instruments is associated with the calculating of cycles in the graph.

8. The computer implemented method of claim 6, wherein the calculating of implied orders includes calculation of one or more shortest path trees including one or more nodes.

9. The computer implemented method of claim 1, further comprising:

assigning a priority to at least one of the first tradable combination and the second tradable combination.

10. The computer implemented method of claim 1, wherein the outputted representation of the implied order appears on a display.

11. The computer implemented method of claim 1, wherein the first real order is selected from the group consisting of a butterfly spread, a double butterfly spread, a crack spread, a crush spread, or a ratio spread.

12. An electronic trading system comprising:

a match engine order submission point configured to receive at least a first real order and a second real order;

a match engine processor configured to identifying a tradable combination and an implied order, wherein the tradable combination includes the first real order, the second real order, and a trigger order tradable with the implied order, wherein at least one of the first real order, the second real order, and the trigger order is used two or more times in the tradable combination; and a reporting device configured to output a representation of at least one of the tradable combination and the implied order to the electronic trading system.

13. The electronic trading system of claim 12, wherein the match engine processor is further configured to identify a second tradable combination including the first real order and the second real order and the reporting device is configured to output an adjusted property of at least one of the first real order and the second real order.

14. The electronic trading system of claim 12, wherein the at least one property comprises trade volume.

15. The electronic trading system of claim 12, wherein the reporting device is further configured to generate an execution report including at the tradable combination.

16. The electronic trading system of claim 12, wherein the match engine processor is further configured to translating data associated with at least one of the first real order, the second real order, and the third real order according to syntactic mapping of a modeling language.

17. The electronic trading system of claim 16, wherein the modeling language represents tradable instruments with nodes and edges in a graph and the calculating of tradable combinations of orders in these instruments is associated with the calculating of cycles in the graph.

18. The electronic trading system of claim 12, wherein the match engine is configured to calculate implied orders includes by calculating one or more shortest path trees including one or more nodes.

19. The electronic trading system of claim 12, wherein the match engine processor is further configured to assign a priority to the tradable combination.

20. The electronic trading system of claim 12, further comprising:

a display in communication with the reporting device and configured to output a representation of the implied order.

21. The electronic trading system of claim 12, wherein the first real order is selected from the group consisting of a butterfly spread, a double butterfly spread, a crack spread, a crush spread, or a ratio spread.

22. A computer implemented method of providing implied orders in an electronic trading system, the method comprising:

receiving, by an automated programmed computer, a trigger order at a match engine;

identifying, by the automated programmed computer, a tradable cycle comprising the trigger order, a resting order, and a spread order, wherein the trigger order is used two or more times in the tradable cycle; and outputting the tradable cycle to the electronic trading system.

\* \* \* \* \*